(12) United States Patent
Terakawa

(10) Patent No.: US 7,689,034 B2
(45) Date of Patent: Mar. 30, 2010

(54) LEARNING METHOD FOR DETECTORS, FACE DETECTION METHOD, FACE DETECTION APPARATUS, AND FACE DETECTION PROGRAM

(75) Inventor: Kensuke Terakawa, Kanagawa-ken (JP)

(73) Assignee: Fujifilm Corporation (JP)

( * ) Notice: Subject to any disclaimer, the term of this patent is extended or adjusted under 35 U.S.C. 154(b) by 957 days.

(21) Appl. No.: 11/453,777

(22) Filed: Jun. 16, 2006

(65) Prior Publication Data

US 2007/0292019 A1 Dec. 20, 2007

(30) Foreign Application Priority Data

Jun. 16, 2005 (JP) ............................. 2005-176346

(51) Int. Cl.
*G06K 9/62* (2006.01)
*G06K 9/00* (2006.01)

(52) U.S. Cl. ....................................... 382/159; 382/118

(58) Field of Classification Search ................. 382/118, 382/159, 195, 224–225, 289
See application file for complete search history.

(56) References Cited

U.S. PATENT DOCUMENTS

| 7,542,591 B2 * | 6/2009 | Li ................................ 382/118 |
| 2001/0053292 A1 * | 12/2001 | Nakamura ................... 396/661 |
| 2002/0150291 A1 * | 10/2002 | Naf et al. ..................... 382/162 |
| 2005/0100195 A1 | 5/2005 | Li |

OTHER PUBLICATIONS

S. Lao et al., "Fast Omni-Directional Face Detection", Meeting on Image Recognition and Understanding, pp. II-271-II-276, 2004.

* cited by examiner

*Primary Examiner*—Daniel G Mariam
(74) *Attorney, Agent, or Firm*—Studebaker & Brackett PC; Donald R. Studebaker

(57) ABSTRACT

In a method of detecting a face in various directions in a target image with use of detectors, a partial image cut sequentially from the target image is subjected to mirror reversal processing and rotation processing in 90 degree increments for generating reversed/rotated images of the partial image. The detectors of predetermined types judge whether the respective images represent face images in predetermined face directions and orientations. Based on combinations of the types of the detectors and the types of the input images, faces in various face directions and orientations can be judged.

18 Claims, 18 Drawing Sheets

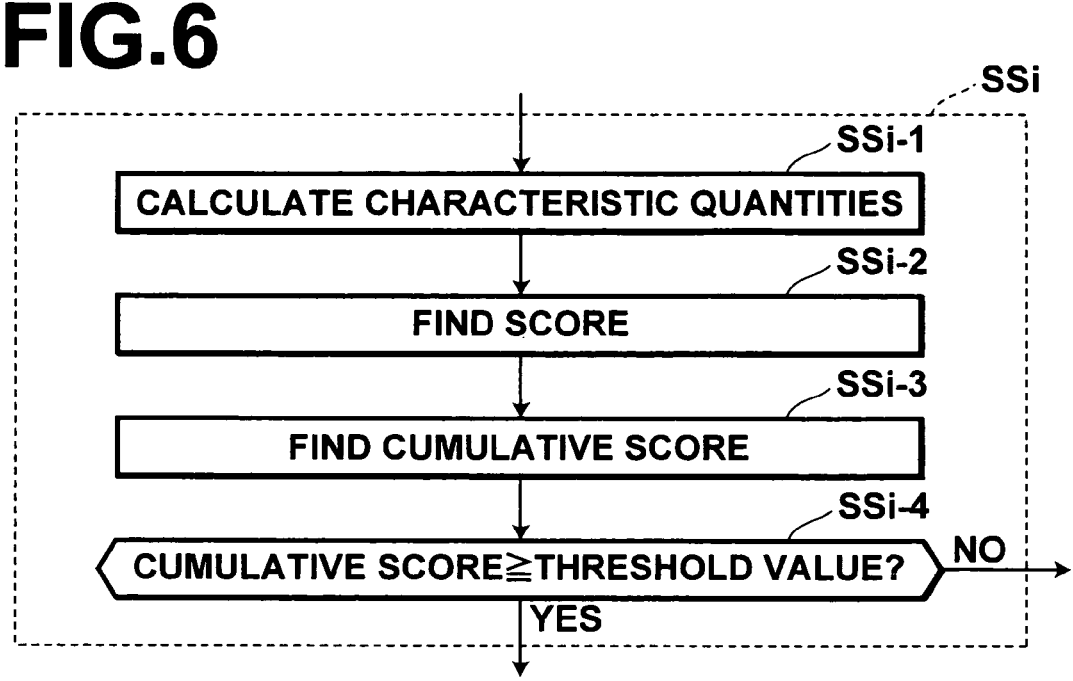
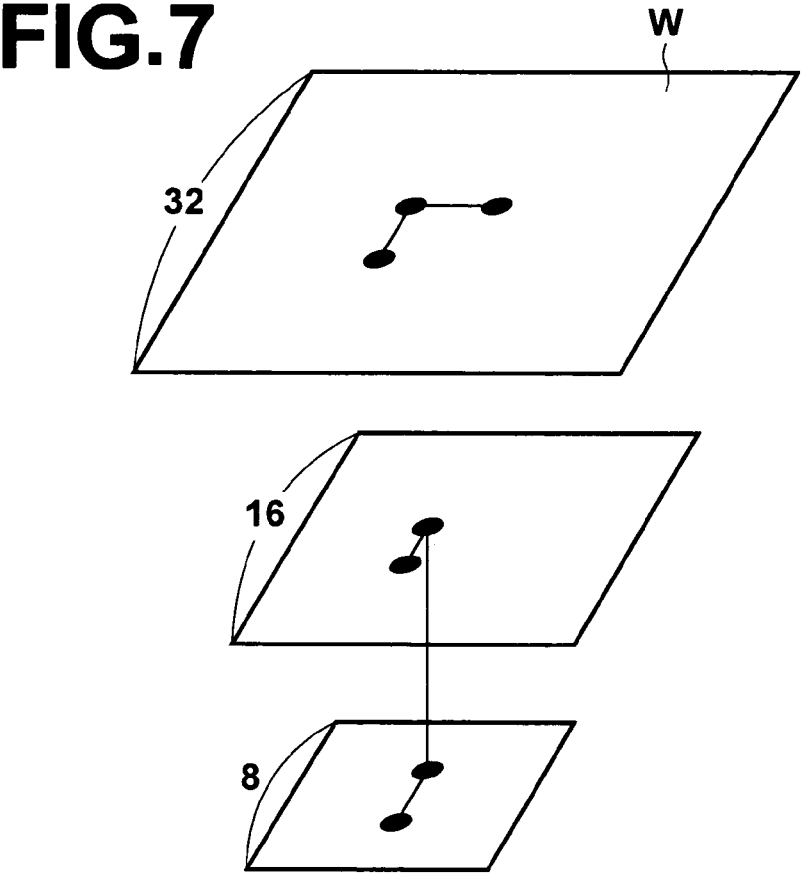

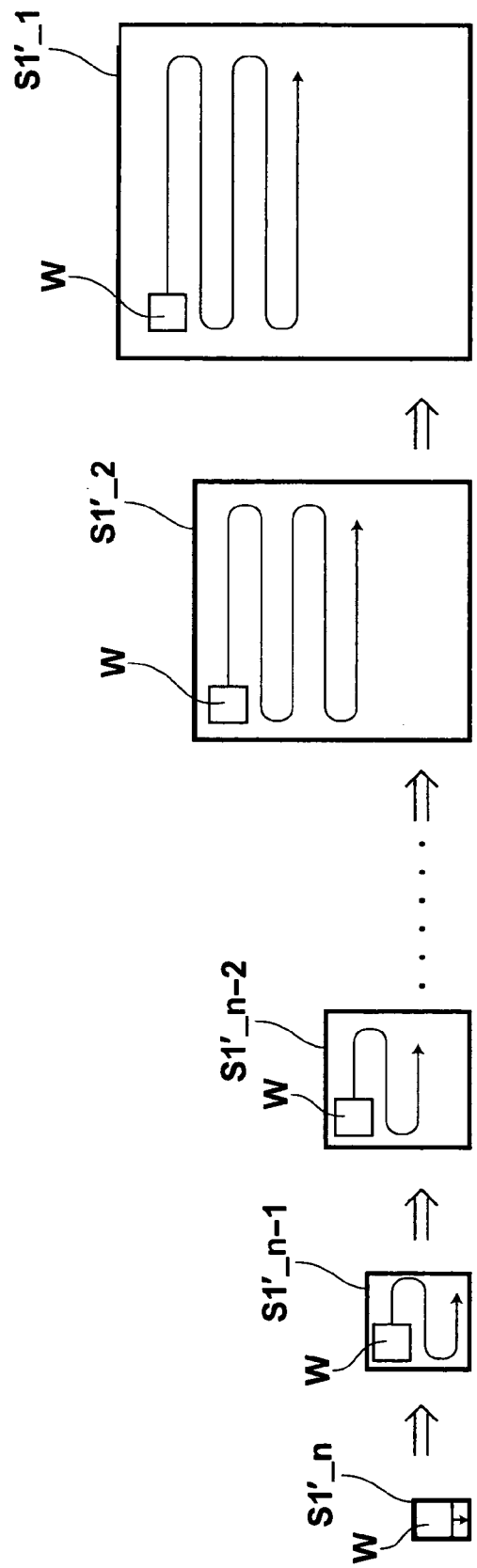

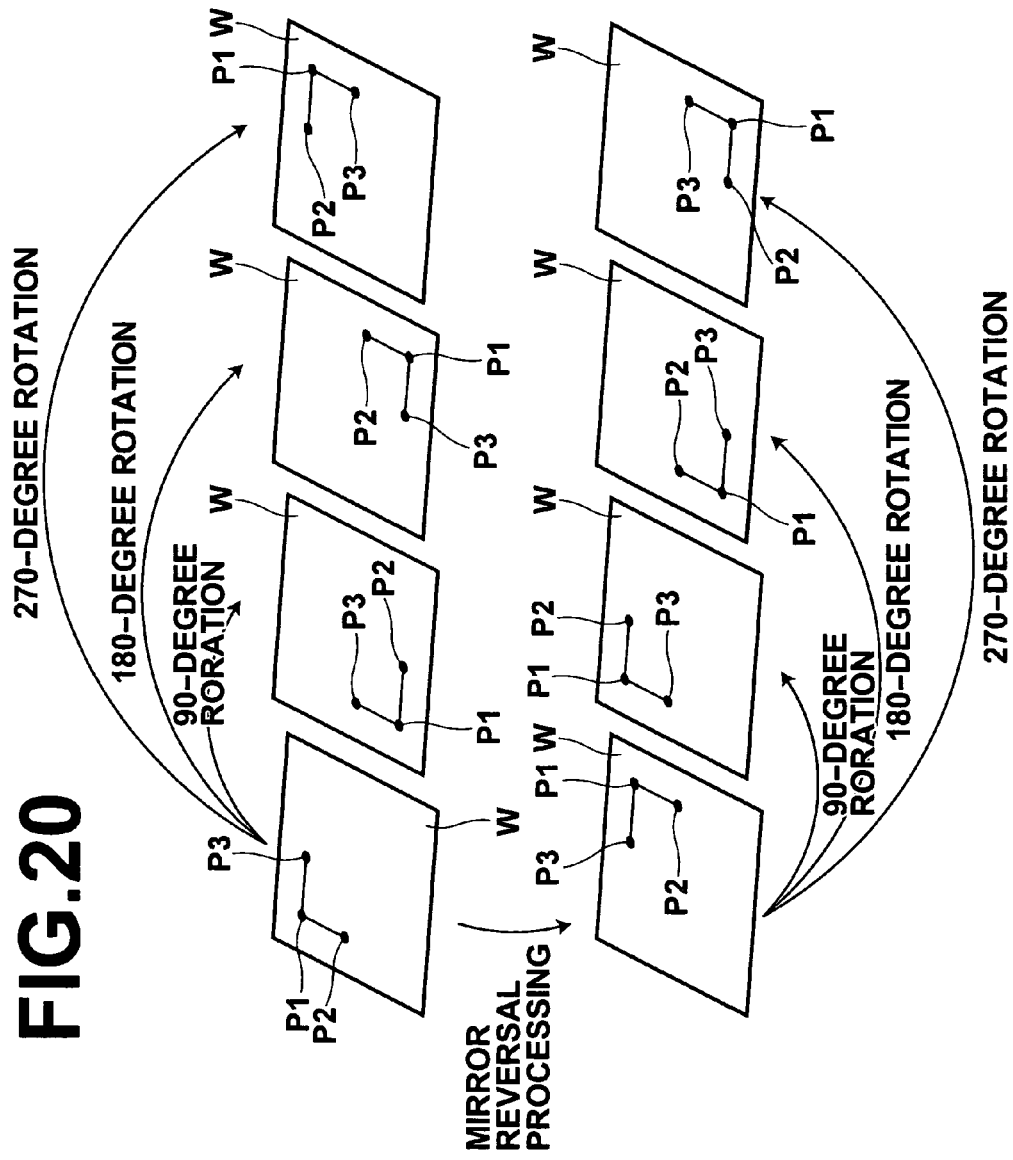

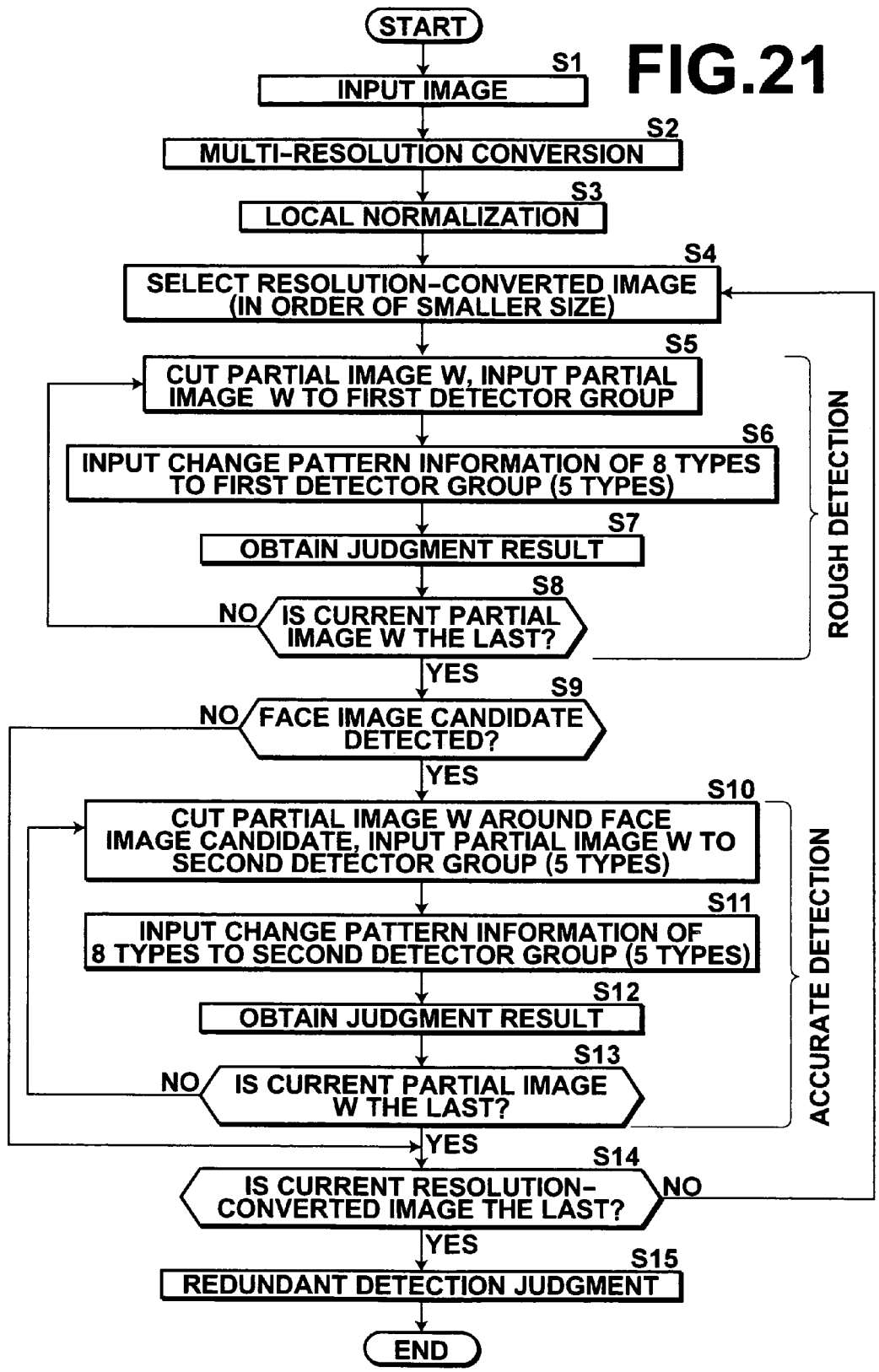

LEARNING METHOD FOR DETECTORS, FACE DETECTION METHOD, FACE DETECTION APPARATUS, AND FACE DETECTION PROGRAM

BACKGROUND OF THE INVENTION

1. Field of the Invention

The present invention relates to a method of generating a detector for judging whether a predetermined image is a face image, which is suitable for detection of a face in a target image. The present invention also relates to a method, an apparatus, and a program for face detection using the detector.

2. Description of the Related Art

Correction of skin color in the face regions of people has been carried out in photographs obtained by digital cameras, based on the color distributions thereof. Recognition of a person is also carried out in a digital video image photographed by a digital camcorder of a monitoring system. In these cases, the face region corresponding to the face of the person needs to be detected in the digital image. Therefore, various methods have been proposed for face detection in a digital image. As a method of face detection achieving especially high detection accuracy and robustness has been known a method using a detector module (hereinafter simply referred to as a detector) generated according to a machine learning method using sample images (see "Fast Omni-Directional Face Detection", Shihong LAO et al., Proceedings of Meeting on Image Detection and Understanding (MIRU) 2004, pp. II-271-II-276 and U.S. patent Application Publication No. 20050100195, for example).

In these methods, a detector is generated in advance which has learned characteristics of faces from a face sample image group comprising face sample images, in which the directions and the orientations of faces are substantially the same, and from a non-face sample image group comprising non-face images. The detector can judge whether an image represents a face in a predetermined direction and orientation. Partial images are sequentially cut from the image as targets of face detection (hereinafter referred to as detection target images), and whether the partial image is a face image is judged by use of the detector. In this manner, faces in the detection target images are detected. In order to maintain detection accuracy in a predetermined range, the learning by the detector is generally carried out based on the face sample images having the same face direction and orientation. In this case, the direction and orientation of a face that can be detected strongly depend on the face direction and orientation in the face sample images.

In the case where faces in arbitrary directions and orientations are to be detected in detection target images, a sample image group is generally generated for each combination of face directions and orientations, and the learning is carried out for each of the combinations based on the sample image groups. In this manner, a plurality of detectors are generated for the respective combinations, and the detectors are applied to a partial images cut sequentially from detection target images.

However, in the above manner, the sample image groups are necessary for the respective combinations of the face directions and orientations and the learning is carried out for the respective combinations based on the sample image groups. Consequently, preparation of the sample image groups and the learning are time-consuming and inefficient. For example, in the case where the face directions to be detected are front, right, and left and the orientations are 12 directions obtained by division of 360 degrees by 30 degrees, the number of the combinations is 36 (=3×12), for all of which the sample image groups and the learning are necessary.

SUMMARY OF THE INVENTION

The present invention has been conceived based on consideration of the above circumstances. An object of the present invention is therefore to provide a learning method for detectors, a face detecting method, and a face detecting apparatus that enable efficient detection of a face in a detection target image with use of the detectors, and to provide a program therefor.

A learning method of the present invention is a method for detectors that judge whether a detection target image is a face image, and the method comprises the steps of:

obtaining face sample image groups each comprising face sample images in which the directions and the orientations of faces are substantially the same, for N types of combinations of the directions and the orientations that are different from each other and predetermined;

obtaining N+M types of face sample image groups by generating M other types of face sample image groups wherein combinations of the directions and the orientations are different from the directions and orientations of the N types of face sample image groups, through mirror reversal processing and/or rotation processing in 90 degree increments on at least one of the N types of face sample image groups; and obtaining N+M types of the detectors for which combinations of the directions and the orientations of faces to be detected respectively correspond to the N+M types of face sample image groups, by causing the respective detectors to learn a characteristic of faces corresponding to the N+M types of face sample image groups.

The detectors here refer to means for judging whether a detection target image is a face image. For example, the detectors may be detector modules in software.

The directions of faces refer to directions of horizontal swinging of heads, while the orientations refer to directions with respect to the vertical axes of heads.

The numbers N and M are natural numbers.

The rotation processing in 90 degree increments refers to rotation processing including 90-degree rotation, 180-degree rotation, and 270-degree rotation.

The learning may be so-called machine learning by AdaBoost or the like.

A first face detection method of the present invention is a face detection method for judging whether a detection target image is a face image, and the method comprises the steps of:

obtaining face sample image groups each comprising face sample images in which the directions and the orientations of faces are substantially the same, for N types of combinations of the directions and the orientations that are different from each other and predetermined;

obtaining N+M types of face sample image groups by generating M other types of face sample image groups wherein combinations of the directions and the orientations are different from the directions and orientations of the N types of face sample image groups, through mirror reversal processing and/or rotation processing in 90 degree increments on at least one of the N types of face sample image groups; and judging whether the detection target image is a face image in any one of combinations of predetermined face directions and orientations the number of which is larger than N, by applying to the detection target image N+M types of detectors that judge whether a detection target image is a face image. The detectors have been obtained by causing the respective detectors to learn a characteristic of faces corresponding to the N+M types of face sample image groups, and combinations of directions and orientations of faces for the detectors to detect respectively correspond to the N+M types of face sample images.

A first face detection apparatus of the present invention is an apparatus for judging whether a detection target image is a face image, and the apparatus comprises N+M types of detectors and judgment means. The N+M types of detectors are generated according to the steps of:

obtaining face sample image groups each comprising face sample images in which the directions and the orientations of faces are substantially the same, for N types of combinations of the directions and the orientations that are different from each other and predetermined;

obtaining N+M types of face sample image groups by generating M other types of face sample image groups wherein combinations of the directions and the orientations are different from the directions and orientations of the N types of face sample image groups, through mirror reverse processing and/or rotation processing in 90 degree increments on at least one of the N types of face sample image groups; and obtaining the N+M types of detectors for which combinations of directions and orientations of faces to be detected respectively correspond to the N+M types of face sample image groups, by causing the respective detectors to learn a characteristic of faces corresponding to the N+M types of face sample image groups. The judgment means judges whether the detection target image is a face image in any one of the N+M types of combinations of directions and orientations, by applying the N+M types of detectors to the detection target image.

A learning program of the present invention is a program for causing a computer to carry out learning processing for detectors that judge whether a target image is a face image, and the program comprises the procedures of:

obtaining face sample image groups each comprising face sample images in which the directions and the orientations of faces are substantially the same, for N types of combinations of the directions and the orientations that are different from each other and predetermined;

obtaining N+M types of face sample image groups by generating M other types of face sample image groups wherein combinations of the directions and the orientations are different from the directions and orientations of the N types of face sample image groups, through mirror reversal processing and/or rotation processing in 90 degree increments on at least one of the N types of face sample image groups; and obtaining N+M types of the detectors for which combinations of directions and orientations of faces to be detected respectively correspond to the N+M types of face sample image groups, by causing the respective detectors to learn a characteristic of faces corresponding to the N+M types of face sample image groups.

A first face detector program of the present invention is a program for causing a computer to carry out face detection processing for judging whether a detection target image is a face image, and the program comprises the procedures of:

obtaining face sample image groups each comprising face sample images in which the directions and the orientations of faces are substantially the same, for N types of combinations of the directions and the orientations that are different from each other and predetermined;

obtaining N+M types of face sample image groups by generating M other types of face sample image groups wherein combinations of the directions and the orientations are different from the directions and orientations of the N types of face sample image groups, through mirror reversal processing and/or rotation processing in 90 degree increments on at least one of the N types of face sample image groups; and judging whether the detection target image is a-face image in any one of combinations of predetermined face directions and orientations the number of which is larger than N by applying to the detection target image N+M types of detectors that judge whether a detection target image is a face image. The detectors have been obtained by causing the respective detectors to learn a characteristic of faces corresponding to the N+M types of face sample image groups, and combinations of directions and orientations of faces for the detectors to detect respectively correspond to the N+M types of face sample images.

A second face detection method of the present invention is a method of judging whether a detection target image is a face image, and the method comprises the steps of:

generating J types of reversed/rotated images by carrying out mirror reversal processing and/or rotation processing in 90 degree increments on the detection target image; and judging whether the detection target image and the J types of reversed/rotated images are face images by using K predetermined types of detectors having different combinations of directions and orientations of faces to be detected, whereby whether the detection target image is a face image is judged for predetermined combinations of face directions and orientations the number of which is larger than K.

The K predetermined types of detectors refer to K types of detectors having the predetermined combinations of the directions and the orientations of faces to judge.

A second face detection apparatus of the present invention is a face detection apparatus for judging whether a detection target image is a face image, and the apparatus comprises:

image generation means for generating J types of reversed/rotated images by carrying out mirror reversal processing and/or rotation processing in 90 degree increments on the detection target image; and judgment means for judging whether the detection target image and the J types of reversed/rotated images are face images by using K predetermined types of detectors corresponding to different combinations of directions and orientations of faces to judge, whereby whether the detection target image is a face image is judged for predetermined combinations of directions and orientations of faces the number of which is larger than K.

In the second face detection apparatus of the present invention, the K types of detectors may be 2 types of detectors comprising:

a first front detector for which the face direction to judge is front and for which the face orientation to judge is the same as the orientation of the detection target image; and a second front detector whose face direction to judge is the front and whose face orientation to judge is in an angle rotated by a predetermined degree from the orientation of the detection target image. In this case, the K types of detectors judge whether the respective images are face images regarding at least 3 up to 12 combinations of the directions and the orientations.

In the second face detection apparatus of the present invention, the K types of detectors may be 3 types of detectors comprising:

a first profile detector for which the face direction to judge is either the right or the left and for which the face orientation to judge is the same as the orientation of the detection target image;

a second profile detector whose face direction to judge is either the right or the left and whose face orientation to judge is in an angle rotated by a predetermined degree from the orientation of the detection target image in the direction to turn up the face in the detection target image; and a third profile detector whose face direction to judge is either the right or the left and whose face orientation to judge is in an angle rotated by a predetermined degree from the orientation of the detection target image in the direction to turn down the face in the detection target image. In this case, the K types of detectors judge whether the respective images are face images regarding at least 6 up to 24 combinations of the face directions and the face orientations.

In the second face detection apparatus of the present invention, the K types of detectors may be 5 types of detectors comprising:

a first front detector whose face direction to judge is front and whose face orientation to judge is the same as the orientation of the detection target image;

a second front detector whose face direction to judge is the front and whose face orientation to judge is rotated by a predetermined degree from the orientation of the detection target image;

a first profile detector whose face direction to judge is either the right or the left and whose face orientation to judge is the same as the orientation of the detection target image;

a second profile detector whose face direction to judge is either the right or the left and whose face orientation to judge is rotated by a predetermined degree from the orientation of the detection target image in the direction to turn up the face in the detection target image; and a third profile detector whose face direction to judge is either the right or the left and whose face orientation to judge is rotated by a predetermined degree from the orientation of the detection target image in the direction to turn down the face in the target image. In this case, the K types of detectors judge whether the respective images are face images regarding at least 9 up to 36 combinations of the face directions and the face orientations.

The predetermined degree may be 30 degrees.

In the second face detection apparatus of the present invention, the K types of detectors may have been obtained through learning K types of face sample image groups in each of which a face direction and a face orientation are substantially the same as a predetermined direction and as a predetermined orientation.

In this case, each of the face sample image groups may comprise face sample images wherein the face orientation varies within a range of −15 degrees to +15 degrees from the predetermined orientation.

In the second face detection apparatus of the present invention, it is preferable for the detection target image to have a square shape.

A second face detection program of the present invention is a program for causing a computer to execute face detection processing for judging whether a detection target image is a face image, and the program comprises the procedures of:

generating J types of reversed/rotated images by carrying out mirror reversal processing and/or rotation processing in 90 degree increments on the detection target image; and judging whether the detection target image and the J types of reversed/rotated images are face images by using K predetermined types of detectors having different combinations of directions and orientations of faces to be detected, whereby whether the detection target image is a face image is judged for predetermined combinations of face directions and orientations the number of which is larger than K.

A third face detection method of the present invention is a method of judging whether a detection target image is a face image by using detectors that judge whether the detection target image is a face image representing a face in a predetermined direction and in a predetermined orientation according to a characteristic quantity related to density of a predetermined pixel in the detection target image, and the method comprises the steps of:

preparing K predetermined types of the detectors corresponding to different combinations of face directions and face orientations; and carrying out judgment by each of the detectors through calculation of the characteristic quantity for the case where a position of the predetermined pixel in the detection target image as a basis of the calculation of the characteristic quantity is a predetermined position and for the case where the position of the predetermined pixel is a position moved from the original position by mirror reversal processing and/or rotation processing in 90 degree increments thereon, whereby the judgment is made as to whether the detection target image is a face image regarding predetermined combinations of face directions and orientations the number of which is larger than K.

A third face detection apparatus of the present invention is an apparatus for judging whether a detection target image is a face image, and the apparatus comprises:

K predetermined types of detectors corresponding to different combinations of face directions and orientations, for judging whether the detection target image is a face image representing a face in a predetermined direction and a predetermined orientation according to a characteristic quantity related to density of a predetermined pixel in the detection target image; and judgment means for carrying out judgment by each of the detectors through calculation of the characteristic quantity for the case where a position of the predetermined pixel in the detection target image as a basis of the calculation of the characteristic quantity is a predetermined position and for the case where the position of the predetermined pixel is a position moved from the original position by mirror reversal processing and/or rotation processing in 90 degree increments thereon, whereby the judgment is made as to whether the detection target image is a face image regarding predetermined combinations of face directions and orientations the number of which is larger than K.

A third face detection program of the present invention is a program for causing a computer to function as:

K predetermined types of detectors corresponding to different combinations of face directions and orientations, for judging whether the detection target image is a face image representing a face in a predetermined direction and a predetermined orientation according to a characteristic quantity related to density of a predetermined pixel in the detection target image; and judgment means for carrying out judgment by each of the detectors through calculation of the characteristic quantity for the case where a position of the predetermined pixel in the detection target image as a basis of the calculation of the characteristic quantity is a predetermined position and for the case where the position of the predetermined pixel is a position moved from the original position by mirror reversal processing and/or rotation processing in 90 degree increments thereon, whereby the judgment is made as to whether the detection target image is a face image regarding predetermined combinations of face directions and orientations the number of which is larger than K.

The programs of the present invention may be provided as computer-readable recording media storing the programs therein. Alternatively, the programs of the present invention may be provided through downloading thereof via a network.

According to the learning method and the learning program of the present invention for detectors, one or more of the face sample image groups of the different combinations of the face directions and the face orientations is/are subjected to mirror reversal processing and/or rotation processing in 90 degree increments for generating the face sample image groups in the combinations of the face directions and orientations different from those for the initially prepared face sample image groups. In this manner, the types of the face sample image groups are augmented, and the face sample image groups are provided for the learning by the detectors. Therefore, the detectors of a few types can learn the sample image groups of more types, enabling efficient face detection.

According to the first dace detection method, the first face detection apparatus, and the first face detection program of the present invention, whether the detection target image is a face image can be judged by the detectors having finished the learning according to the learning method of the present invention. Therefore, the amount of time necessary for the detectors to learn can be shortened, and efficient face detection can thus be realized.

According to the second face detection method, the second face detection apparatus, and the second face detection program of the present invention, the detection target image is subjected to the mirror reversal processing and/or the rotation processing in 90 degree increments, and the images different from the original detection target image are generated as other detection targets. The detectors of the predetermined types then judge whether the images are face images in the predetermined face directions and orientations. Therefore, the detectors of a few types can make judgment on face images of more types, and efficient face detection can be realized.

According to the third face detection method, the third face detection apparatus, and the third face detection program of the present invention, the detectors of the predetermined types are prepared regarding the different combinations of the face directions and orientations for judging whether the detection target image is a face image based on the characteristic quantity related to the density of the predetermined pixel in the detection target image. Each of the detectors then carries out the judgment based on the characteristic quantity calculated for the case where the position of the predetermined pixel is the predetermined position and for the case where the position of the predetermined pixel is the position moved from the original position by mirror reversal processing and/or rotation processing in 90 degree increments thereon. Therefore, the judgment can be made regarding faces of more types by the detectors of a few types. In addition, since mirror reversal processing/rotation processing of the target image itself, which is a time-consuming process, is not necessary. In this manner, efficient face detection can be realized.

BRIEF DESCRIPTION OF THE DRAWINGS

FIG. 6 shows a processing flow in weak classifiers;

FIG. 7 shows how characteristic quantities are calculated in the weak classifiers;

FIG. 8 shows changing resolution-converted images as a face detection target and how a sub-window moves therein;

FIG. 20 shows how positions of pixels change for calculation of characteristic quantities; and FIG. 21 is a flow chart showing a procedure carried out in a face detection system 1 in the third embodiment.

DESCRIPTION OF THE PREFERRED EMBODIMENTS

Hereinafter, embodiments of the present invention will be described.

Figure 1:
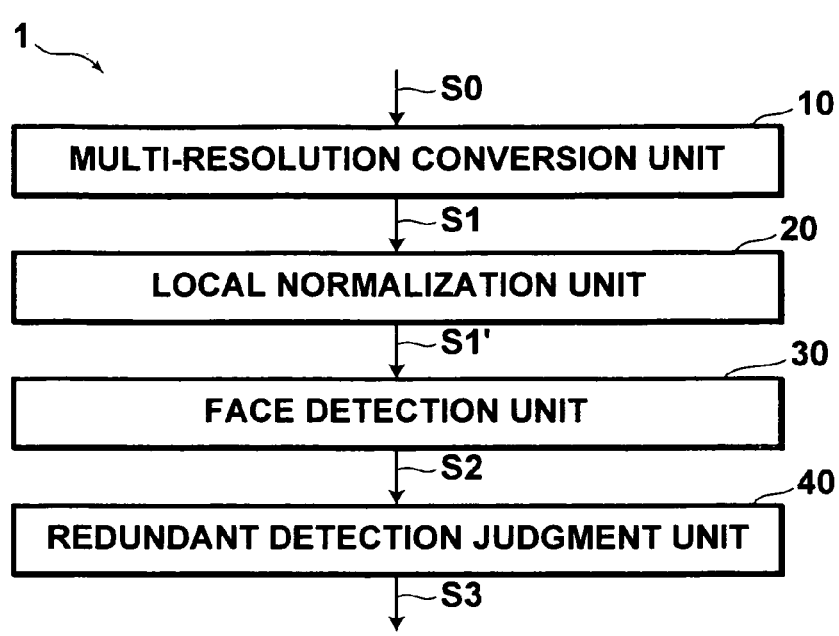
FIG. 1 is a block diagram showing the configuration of a face detection system 1.

A first embodiment of the present invention is described first. FIG. 1 is a block diagram showing the configuration of a face detection system 1 adopting the first face detection apparatus of the present invention. The face detection system 1 detects a face in a digital image regardless of a position, size, direction, and rotation thereof. AS shown in FIG. 1, the face detection system 1 comprises a multi-resolution conversion unit 10, a local normalization unit 20, a face detection unit 30, and a redundant detection judgment unit 40. The multi-resolution conversion unit 10 obtains a resolution-converted image group S1 (=S1_1, S1_2, ..., S1_n) having different resolutions by carrying out multi-resolution conversion on an input image S0 as a target of face detection. The local normalization unit 20 (normalization means) obtains a locally normalized resolution-converted image group S1' (=S1'_1, S1'_2, ..., S1'_n) by carrying out normalization for suppressing contrast variance in local regions in each of the images in the resolution-converted image group S1 (hereinafter referred to as local normalization) as pre-processing for improvement in accuracy of face detection carried out later. The face detection unit 30 detects an image representing a face (hereinafter referred to as a face image S2) in each of the resolution-converted images in the image group S1' by carrying out face detection processing thereon. The redundant detection judgment unit 40 obtains a face image S3 without redundant face detection by judging whether the same face has been detected in the face images S2, based on a position thereof.

Figure 2:
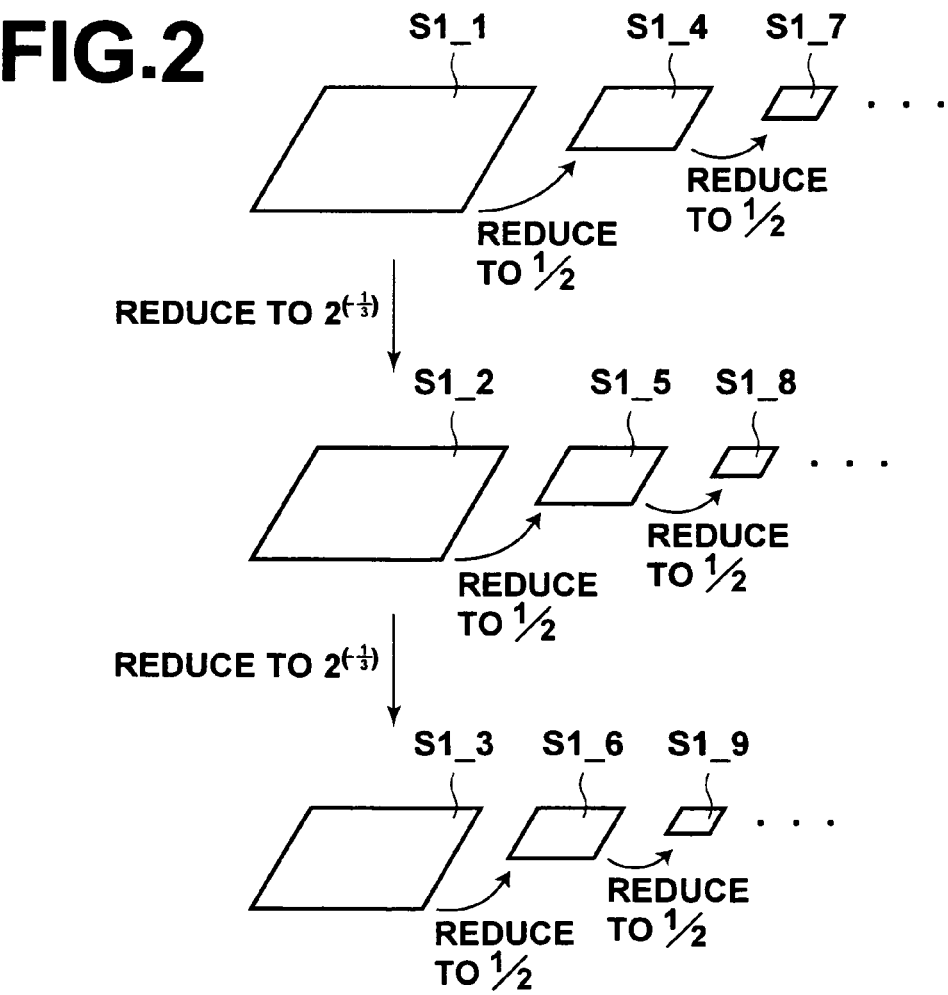
FIG. 2 shows a process of multi-resolution conversion of a detection target image.

The multi-resolution conversion unit 10 obtains a normalized input image S0' by normalizing the input image S0 into a predetermined resolution such as a rectangular image whose shorter side has 416 pixels, through conversion of the resolution (image size) of the input image S0. By further carrying out the resolution conversion on the normalized image S0', the multi-resolution conversion unit 10 generates the resolution-converted images in the different resolutions, for obtaining the resolution-converted image group S1. The resolution-converted image group S1 is generated for the following reason. A size of a face included in an input image is generally unknown. However, a size of face (image size) to be detected is fixed to a predetermined size, in relation to a detector generation method that will be described later. Therefore, in order to detect faces in various sizes, a partial image of a predetermined size is cut sequentially in each of the resolution-converted images while a position of the partial image is shifted therein. Whether the partial image is a face image or a non-face image is then judged. More specifically, as shown in FIG. 2, the normalized input image S0' is used as the resolution-converted image S1_1. Based on the resolution-converted image S1_1 is generated the resolution-converted image S1_2 in the size of 2 to the power of $-\frac{1}{3}$ of the resolution-converted image S1_1. Based on the resolution-converted image S1_2 is generated the resolution-converted image S1_3 in the size of 2 to the power of $-\frac{1}{3}$ of the resolution-converted image S1_2 (that is, in the size of 2 to the power of $-\frac{2}{3}$ of the resolution-converted image S1_1). The resolution-converted images S1_1 to S1_3 are respectively subjected to size reduction to $\frac{1}{2}$, and images generated by the reduction are further reduced to $\frac{1}{2}$. This procedure is repeated and the resolution-converted images are generated up to a predetermined quantity. In this manner, the images whose sizes have been reduced from the image S1_1 to every 2 to the power of $-\frac{1}{3}$ can be generated fast through the reduction to $\frac{1}{2}$ that does not need interpolation of pixel values representing luminance. For example, in the case where the image S1_1 has the rectangular shape whose shorter side has 416 pixels, the resolution-converted images S1_2, S1_3 and so on have rectangular shapes whose shorter sides have 330 pixels, 262 pixels, 208 pixels, 165 pixels, 131 pixels, 104 pixels, 82 pixels, 65 pixels, and so on. In this manner, the resolution-converted images reduced to every 2 to the power of $-\frac{1}{3}$ can be generated. The images generated without pixel value interpolation tend to keep characteristics of the original image. Therefore, accuracy improvement is expected in the face detection, which is preferable.

The local normalization unit 20 carries out first luminance gradation conversion on each of local regions in which a degree of variance of pixel values representing luminance (hereinafter simply referred to as the pixel values) is equal to or larger then a predetermined level in each of the images in the resolution-converted image group S1, for causing the degree of variance to become closer to an invariable level higher than the predetermined level. At the same time, the local normalization unit 20 also carries out second luminance gradation conversion on each of local regions in which the degree of variance of the pixel values is smaller than the predetermined level in each of the images in the resolution-converted image group S1, for causing the degree of variance to be suppressed to a level lower than the invariable level. Hereinafter, the processing by the local normalization unit 20 is described specifically.

Figure 12:
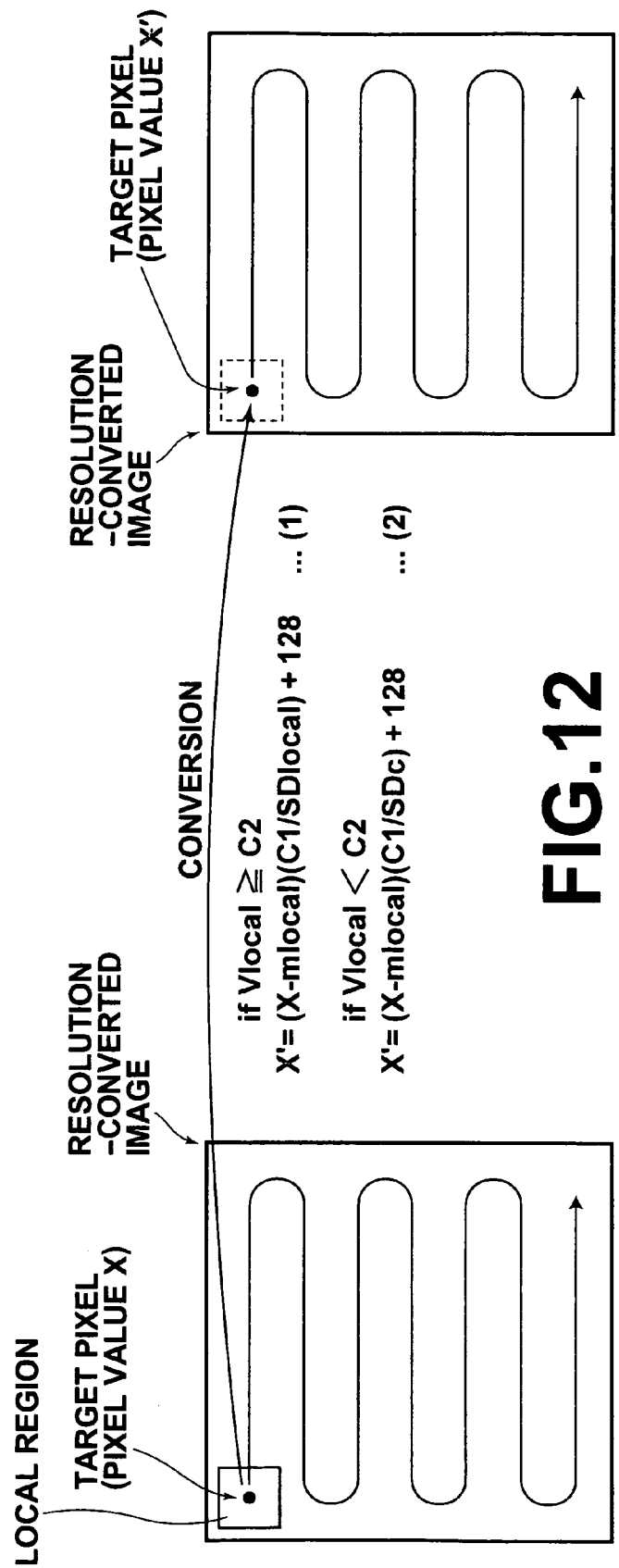
FIG. 12 shows a concept of local normalization processing.
Figure 13:
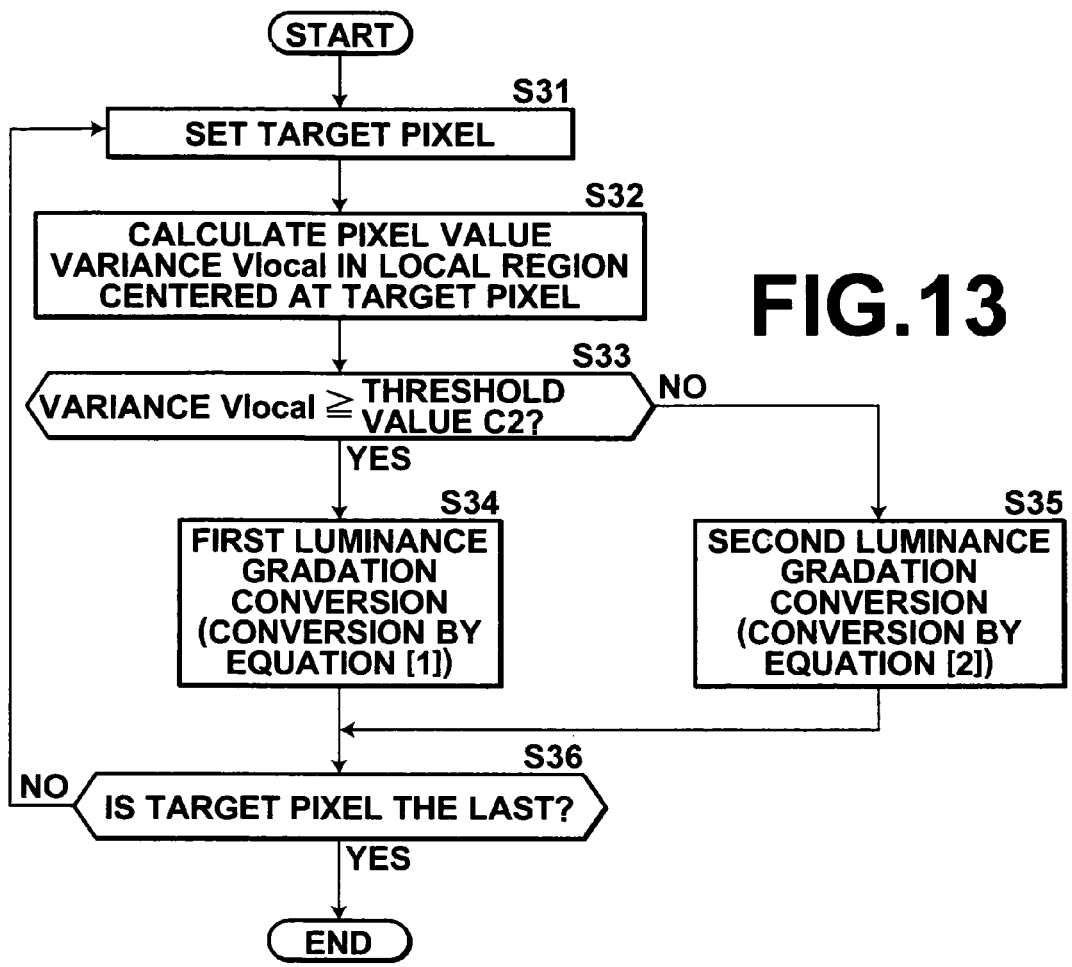
FIG. 13 shows a processing flow in a local normalization unit.

FIG. 12 shows a concept of the local normalization processing while FIG. 13 shows a flow of the processing carried out by the local normalization unit 20. Equations (1) and (2) below are equations for the luminance gradation conversion of the pixel values in the local normalization processing:

| if Vlocal $\geq$ C2 | |
| X'=(X−mlocal) (C1/SDlocal) + 128 | ... (1) |
| if Vlocal < C2 | |
| X'=(X−mlocal) (C1/SDc) + 128 | ... (2) |

In Equations (1) and (2), X refers to the value of a target pixel while X' is the value thereof after the conversion. A mean of the pixel values in the local region surrounding the target pixel is represented by mlocal while the variance thereof is represented by Vlocal. SDlocal denotes a standard deviation of the pixel values therein while (C1×C1) is a reference value corresponding to the invariable level. A threshold value corresponding to the predetermined level is denoted by C2 and SDc is a constant. In this embodiment, the luminance gradation is represented as 8-bit data, and the pixel values therefore range from 0 to 255.

The local normalization unit 20 sets one of pixels in one of the resolution-converted images as the target pixel as shown in FIG. 13 (Step S31), and calculates the variance Vlocal of the pixel values in a local region of 11×11 pixels in which the target pixel is centered (Step S32). The local normalization unit 20 then judges whether the variance Vlocal is equal to or larger than the threshold value C2 corresponding to the predetermined level or smaller then the threshold value C2 (Step S33). In the case where the variance is not smaller than the threshold value C2, the local normalization unit 20 carries out the first luminance gradation conversion according to Equation (1) above wherein a difference between the pixel value X and the mean mlocal is changed to become smaller as the variance Vlocal becomes larger than the reference value (C1×C1) corresponding to the invariable level while the difference between the pixel value X and the mean mlocal is changed to become larger as the variance Vlocal becomes smaller than the reference value (C1×C1) (Step S34). In the case where the variance Vlocal is smaller than the threshold value C2, the local normalization unit 20 carries out, as the second luminance gradation conversion according to Equation (2) above, linear luminance gradation conversion that is not dependent on the variance Vlocal (Step S35). Judgment is then made as to whether the target pixel set at Step S31 is the last pixel to be subjected to the processing (Step S36). In the case where a result of the judgment at Step S36 is negative, the procedure returns to Step S31 for setting the next pixel as the target pixel in the same resolution-converted image. In the case where the result at Step S36 is affirmative, the local normalization processing for the resolution-converted image is completed. By repeating the procedure from Step S31 to S36, the resolution-converted image having been entirely subjected to the local normalization processing is obtained. By carrying out the procedure for each of the resolution-converted images, the resolution-converted image group S1' having been subjected to the local normalization processing is obtained.

The predetermined level may be changed according to partial or overall luminance of the local region. For example, in the local normalization processing for the luminance gradation conversion regarding the target pixel, the threshold value C2 may be changed according to the pixel value of the target pixel. More specifically, the threshold value C2 corresponding to the predetermined level may be set higher if the luminance of the target pixel is relatively high while the threshold value C2 may be set lower if the luminance of the target pixel is relatively low. By setting the threshold value in this manner, a face in low contrast (that is, a state where the variance is small) can be normalized properly in a dark (low luminance) region.

The case where only the local normalization processing is carried out on the resolution-converted images is described here. However, other normalization processing may also be carried out together with the local normalization processing. For example, the local normalization processing may be carried out after luminance gradation conversion is carried out using a look-up table (LUT) for increasing contrast of a dark (low luminance) region (that is, increasing the variance of the pixel values). In this manner, the same effect as changing the threshold value C2 according to the value of the target pixel can be obtained, and a face in low contrast can be normalized properly in a dark region.

Figure 3:
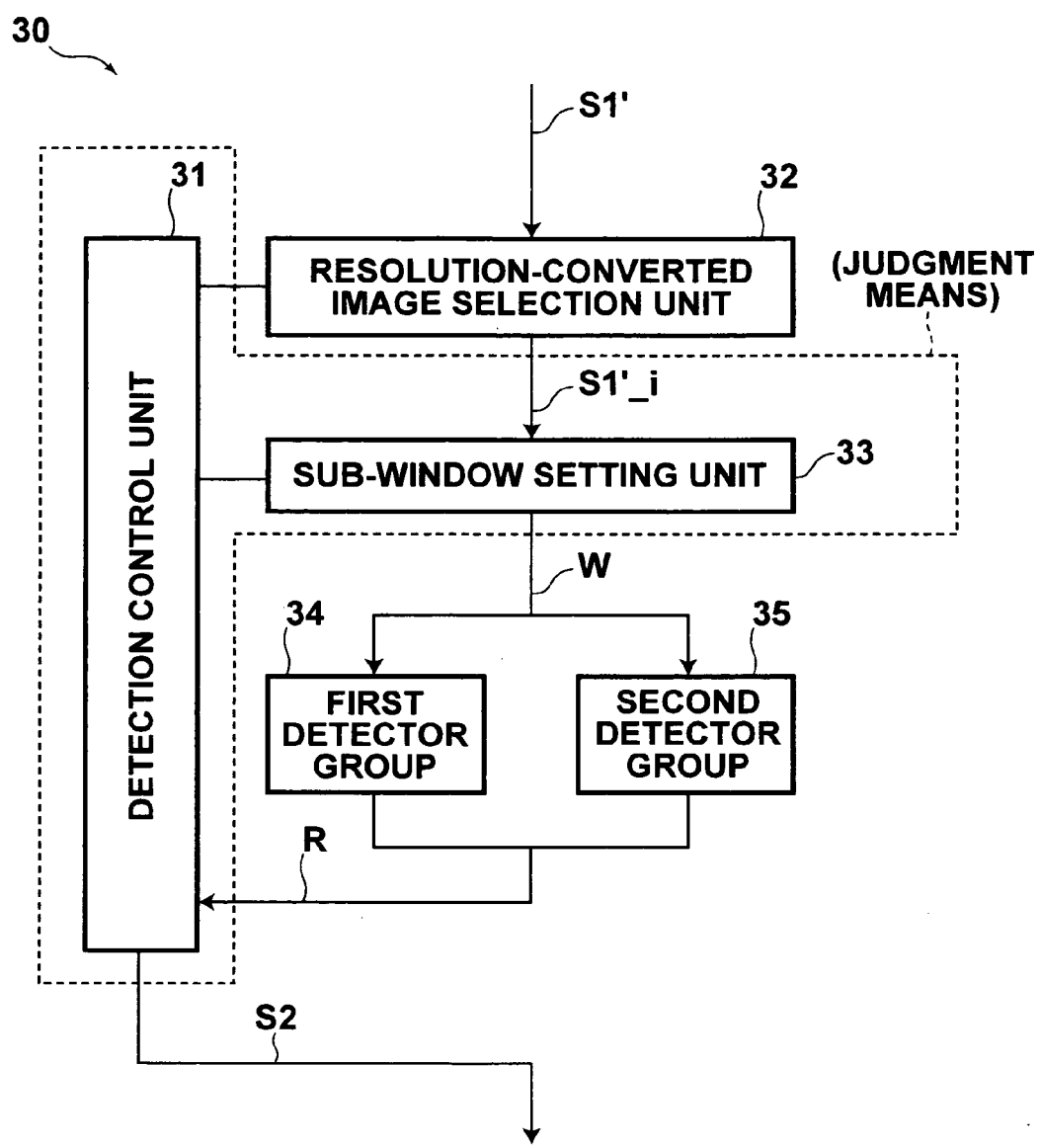
FIG. 3 is a block diagram showing the configuration of a face detection unit 30 in a first embodiment.

The face detection unit 30 carries out face detection processing on each of the images in the resolution-converted image group S1' having been subjected to the local normalization processing carried out by the local normalization unit 20, and detects the face image S2 in each of the resolution-converted images. FIG. 3 is a block diagram showing the configuration of the face detection unit 30. The face detection unit 30 comprises a detection control unit 31, a resolution-converted image selection unit 32, a sub-window setting unit 33, a first detector group 34, and a second detector group 35. The detection control unit 31 mainly carries out sequence control in the face detection processing by controlling each of the units. The resolution-converted image selection unit 32 sequentially selects from the resolution-converted image group S1' one of the resolution-converted images in order of smaller size to be subjected to the face detection processing. The Sub-window setting unit 33 sets a sub-window for cutting a partial image W as a target of judgment of face image or non-face image in the resolution-converted image selected by the resolution-converted image selection unit 32 while sequentially changing a position of the sub-window. The first detector group 34 and the second detector group 35 judge whether the partial image W having been cut is a face image.

The detection control unit 31 controls the resolution-converted image selection unit 32 and the sub-window setting unit 33 for carrying out the face detection processing in 2 steps wherein a candidate for face image (hereinafter referred to as the face image candidate) is roughly detected first in each of the images in the resolution-converted image group S1' and a true face image candidate is extracted as the face image S2 from the candidates. For example, the detection control unit 31 appropriately instructs the resolution-converted image selection unit 32 to select the resolution-converted image to be subjected to the processing and notifies the sub-window setting unit 33 of a condition of sub-window setting. The detection control unit 31 also outputs a result of the detection to the redundant detection judgment unit 40. The condition of sub-window setting includes a range in the image wherein the sub-window is set, a pitch of movement of the sub-window (a level of detection accuracy), and choice of the detector groups to be used for the detection (either rough detection mode or accurate detection mode), for example.

The resolution-converted image selection unit 32 sequentially selects the resolution-converted image in order of smaller size (that is, in order of coarse resolution) from the resolution-converted image group S1', under control of the detection control unit 31. The method of face detection in this embodiment is a method of detecting a face in the input image S0 by judging whether the partial image W cut sequentially in the same size from each of the resolution-converted images is a face image. Therefore, the resolution-converted image selection unit 32 sets a size of face to be detected in the input image S0 at each time of detection, which is equivalent to changing the size of face to be detected from a larger size to a smaller size.

The sub-window setting unit 33 sequentially sets the sub-window according to the sub-window setting condition set by the detection control unit 31 in the resolution-converted image selected by the target resolution-converted image selection unit 32 while sequentially moving the sub-window therein. For example, for the rough detection mode described above, the sub-window is set for cutting the partial image W of a predetermined size (that is, 32×32 pixels) in the selected resolution-converted image while sequentially moving the position thereof by every predetermined number (such as 5) of pixels. The sub-window setting unit 33 inputs the partial image W cut in this manner to the first detector group 34. Each of detectors comprising the detector groups is to judge a face image in a predetermined face direction and in a predetermined face orientation as will be described later, and using the detectors enable detection of an image representing a face in any direction and orientation. In the case where the face image candidate is specified in detail in each of the resolution-converted images, the sub-widow setting unit 33 sets the sub-window in a region of a predetermined size including the face image candidate in the corresponding resolution-converted image while sequentially moving the sub-window by a shorter pitch, such as 1 pixel. The partial image W is cut in the same manner and input to the second detector group 35.

The first detector group 34 is a group of detectors for judging comparatively fast whether the partial image W is a face image, and used for roughly detecting the face image candidate in each of the resolution-converted images. The first detector group 34 comprises parallel-connected detector groups of different types corresponding to different face directions to detect. More specifically, the first detector group 34 comprises a first front detector group 34_F for mainly judging a front-view face, a first right profile detector group 34_R for mainly detecting a right profile, and a left profile detector group 34_L for mainly detecting a left profile. Each of these detector groups comprises detectors corresponding to face orientations varying in 12 directions in 30-degree increments with reference to the orientation of the image. More specifically, the first front detector group 34_F comprises detectors 34_F0, 34_F30, 34_F60, . . . , and 34_F330 while the right profile detector group 34_R comprises 34_R0, 34_R30, 34_R60, . . . , and 34_F330. Likewise, the left profile detector group 34_L comprises 34_L0, 34_L30, 34_L 60, . . . , and 34_L330.

The second detector group 35 is a group of detectors for comparatively accurately judging whether the partial image W is a face image, and used for extracting the true face image S2 from the face image candidate (that is, specifying the face candidate image) by carrying out more detailed detection processing on the face candidate image detected through the rough detection described above. The second detector group 35 comprises parallel-connected detectors of different types having different face directions to detect. More specifically, the second detector group 35 comprises a second front detector group 35_F for mainly judging a front-view face, a second right profile detector group 35_R for mainly detecting a right profile, and a second left profile detector group 35_L for mainly detecting a left profile. Like the first detector group 34, each of these detector groups comprises detectors corresponding to the face orientations varying in 12 directions in 30-degree increments with reference to the orientation of the image. More specifically, the second front detector group 35_F comprises detectors 35_F0, 35_F30, 35_F60, . . . , and 35_F330 while the right profile detector group 35_R comprises 35_R0, 35_R30, 35_R60, . . . , and 35_F330. Likewise, the left profile detector group 35_L comprises 35_L0, 35_L30, 35_L60, . . . , and 35_L330.

Figure 4:
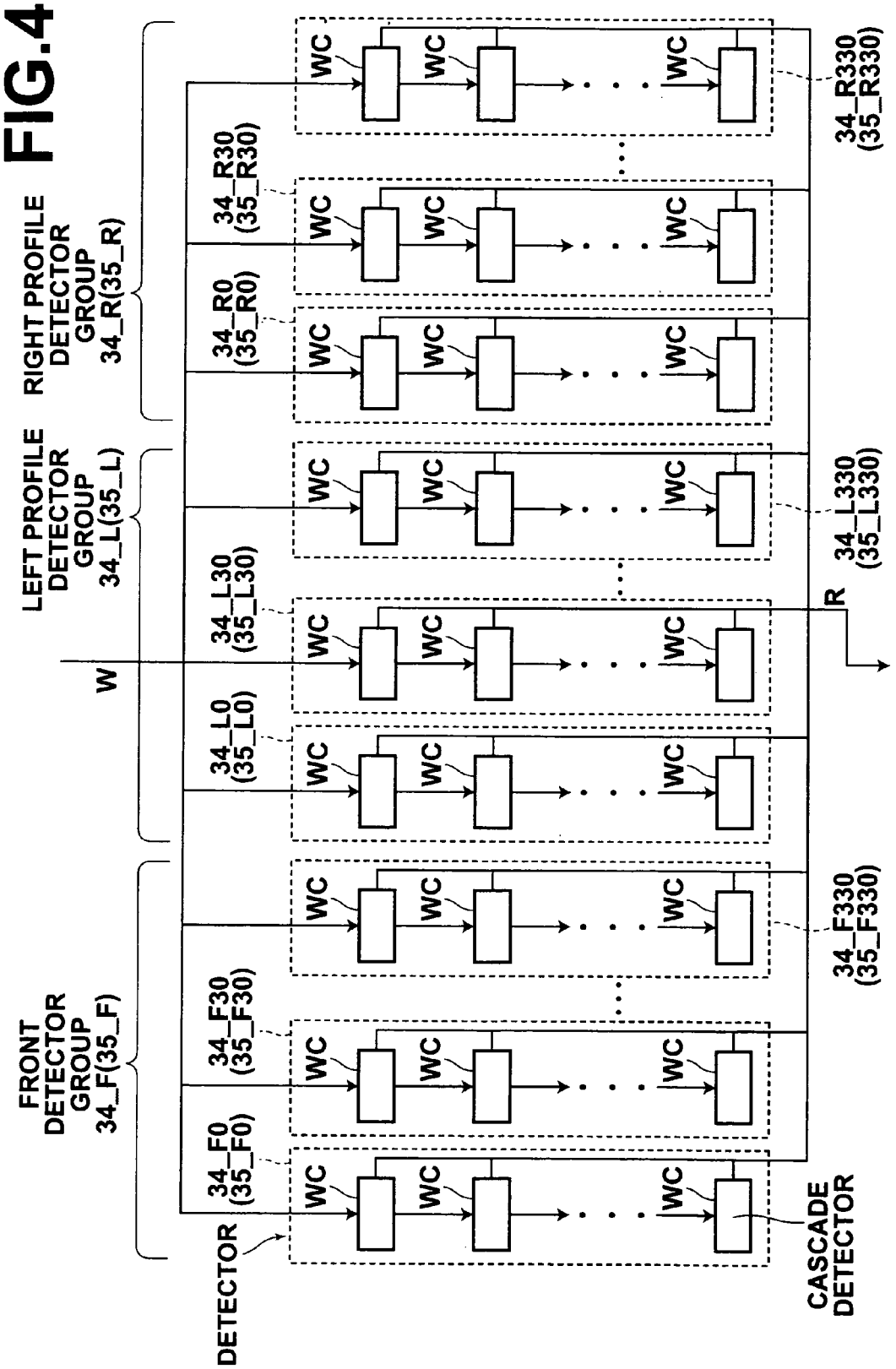
FIG. 4 is a block diagram showing the configuration of first and second detector groups in the first embodiment.

Each of the detectors has a cascade structure wherein a plurality of weak classifiers WC are connected linearly, as shown in FIG. 4. Each of the weak classifiers calculates at least one characteristic quantity related to luminance distribution of the partial image W, and judges whether the partial image W is a face image based on the characteristic quantity or quantities.

The first and second detector groups 34 and 35 have the 3 detectable face directions, that is, front-view face, right profile, and left profile. However, in order to improve detection accuracy on a face looking half left or right, detectors for judging a half-right profile and a half-left profile may also be added.

Figure 5:
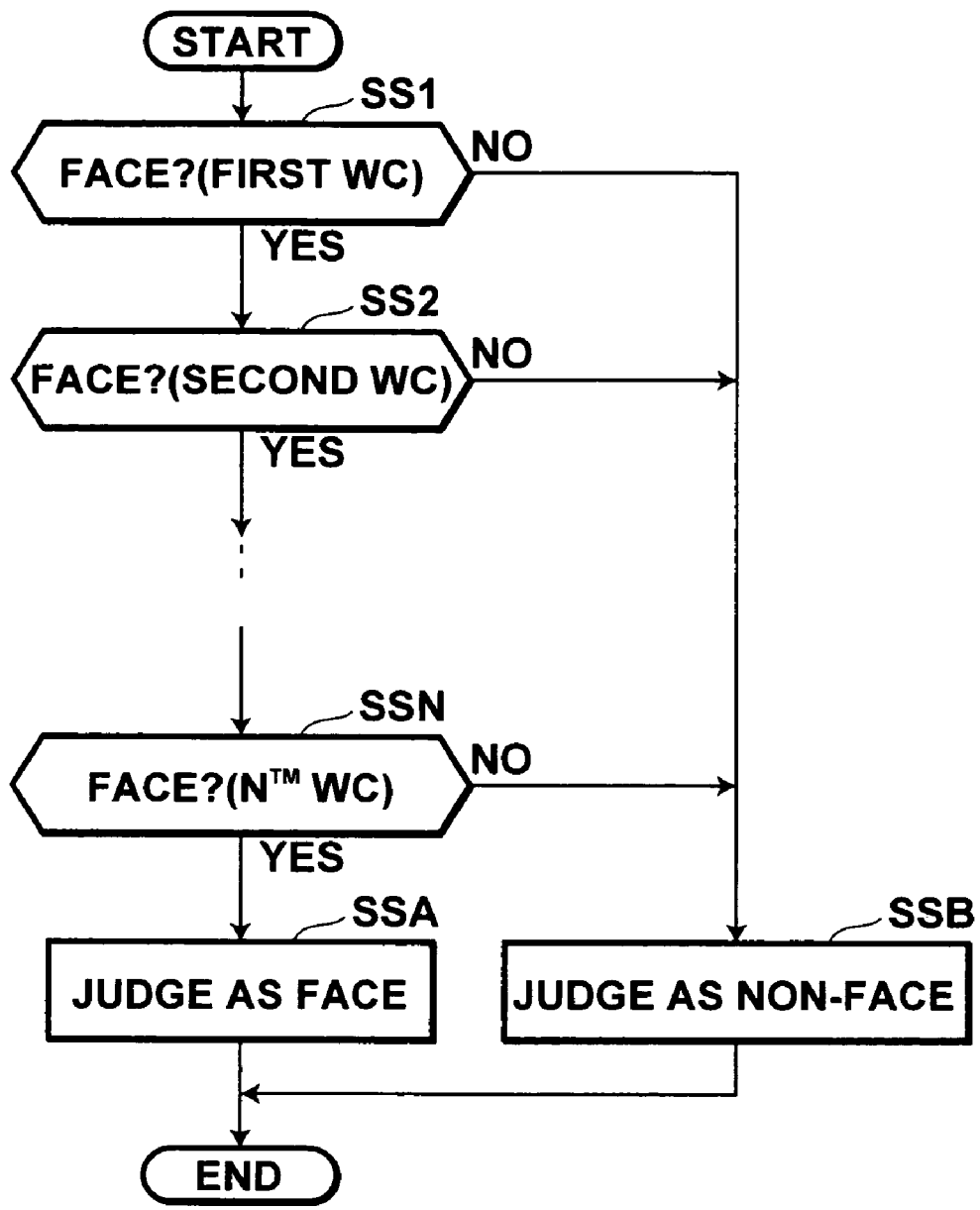
FIG. 5 shows a global processing flow in detectors.

Specific processing carried out by each of the detectors is described below. FIG. 5 shows a global processing flow in each of the detectors, and FIG. 6 shows a processing flow in each of the weak classifiers therein.

The first weak classifier WC judges whether the partial image W of the predetermined size cut from a predetermined one of the resolution-converted images (hereinafter referred to as S1'_i) represents a face (Step SS1). More specifically, the first weak classifier WC carries out 4-neighboring pixel averaging on the partial image W having 32×32 pixels cut from the resolution-converted image S1'_i, as shown in FIG. 7. The 4-neighboring pixel averaging refers to processing wherein the image is divided into blocks of 2×2 pixels and a mean of the values of the 4 pixels in each of the blocks is used as a pixel value corresponding to the block. In this manner, reduced images of 16×16 pixels and 8×8 pixels are generated. Using two predetermined points set in a plane of each of the 3 images as one pair, a difference in luminance is calculated between the two points in each pair comprising one pair group, and a combination of the differences is used as the characteristic quantities (Step SS1-1). The two predetermined points in each of the pairs are predetermined two points aligned vertically or horizontally in the corresponding image so as to reflect a characteristic in density of a face therein, for example. Based on the combination of the differences as the characteristic quantities, a score is calculated with reference to a predetermined score table (Step SS1-2), and a cumulative score is then calculated by adding the score to a score calculated by the proceeding weak classifier or classifiers (Step SS1-3). Since the first weak classifier WC does not have the immediately proceeding weak classifier, the score calculated by the first weak classifier is used as the cumulative score as it is. Whether the partial image W is a face image is judged according to judgment as to whether the cumulative score is equal to or larger than a predetermined threshold value or smaller than the threshold value (Step SS1-4). In the case where the partial image W has been judged to be a face image, judgment by the next weak classifier WC is carried out (Step SS2). In the case where the partial image W has been judged to be a non-face image, the partial image W is immediately confirmed to represent a non-face image (Step SSB), and the procedure ends.

At Step SS2, the second weak classifier WC calculates characteristic quantities representing a characteristic of the image from the partial image W in the same manner as at Step SS1 (Step SS2-1), and finds a score from the characteristic quantities with reference to a score table (Step SS2-2). The cumulative score of the characteristic quantities is updated by addition of the score to the cumulative score calculated by the immediately proceeding first weak classifier WC (Step SS2-3), and whether the partial image W represents a face is judged based on a result of judgment as to whether the cumulative score is equal to or larger than a predetermined threshold value or smaller than the threshold value (Step SS2-4). In the case where the partial image W is again judged to be a face image, the procedure goes to judgment by the third weak classifier (Step SS3). In the case where the partial image W has been judged to be a non-face image, the partial image W is immediately confirmed to be a non-face image (Step SSB) to end the procedure. In the case where the partial image W has been judged to represent a face by all the N weak classifiers WC comprising the detector, the partial image W is finally extracted as the face image candidate (Step SSA).

Each of the detectors is a detector comprising the weak classifiers WC determined by the type of the characteristic quantities, the score table, and the threshold value, and judges a face in the predetermined direction and orientation.

The redundant detection judgment unit 40 carries out processing for classifying the face images representing the same face in the images in the resolution-converted image group S1' (that is, the face images detected more than once) into one face image according to position information on the true face image S2 detected by the face detection unit 30, and outputs a true face image S3 detected in the input image S0. The size of face detected by each of the detectors compared to the size of the partial image W has some margin although the margin depends on the learning method. Therefore, this processing is carried out because the images representing the same face are sometimes detected more than once in the resolution-converted images whose resolutions are close to each other.

Figure 9:
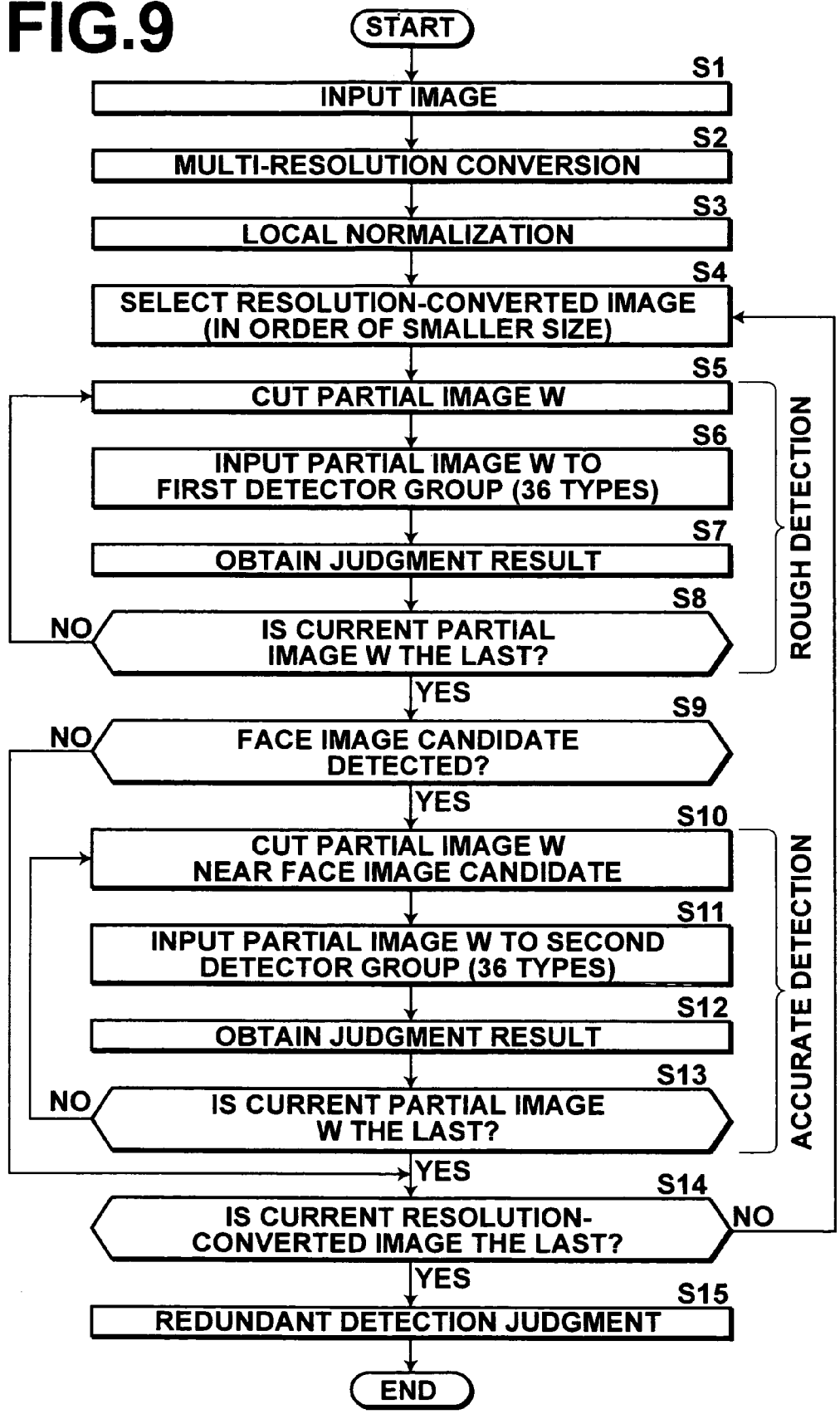
FIG. 9 is a flow chart showing a procedure carried out in the face detection system 1 in the first embodiment.

FIG. 9 is a flow chart showing a procedure carried out in the face detection system 1. As shown in FIG. 9, the input image S0 is fed to the multi-resolution conversion unit 10 (Step S1), and the image S0' is generated in the predetermined size converted from the size of the input image S0. The resolution-converted image group S is generated comprising the resolution-converted images having the sizes (resolutions) reduced to every 2 to the power of −⅓ from the image S0' (Step S2). The local normalization unit 20 carries out the local normalization processing for suppressing the variance of contrast in the local regions, entirely on each of the resolution-converted images. In other words, the local normalization unit 20 carries out the local normalization processing comprising the luminance gradation conversion to cause the variance of the pixel values to become closer to the invariable level in the regions wherein the variance is equal to or larger than the predetermined threshold value and the luminance gradation conversion to cause the variance to be suppressed to a level lower than the invariable level in the regions wherein the variance is smaller than the predetermined threshold value. In this manner, the local normalization unit 20 obtains the locally normalized resolution-converted image group S1' (Step S3). In the face detection unit 30, the resolution-converted image selection unit 32 instructed by the detection control unit 31 sequentially selects the resolution-converted image to be subjected to the face detection processing in order of smaller image size from the resolution-converted image group S1'. In other words, the resolution-converted image S1'_i is selected in order of S1'_n, S1'_n-1, . . . , and S1'_1 from the resolution-converted images S1' (Step S4). The detection control unit 31 sets the sub-window setting condition for the sub-window setting unit 33 in order to set the detection mode to the rough detection mode. In this manner, the sub-window setting unit 33 sets the sub-window in the resolution-converted image S1'_i while moving the sub-window in the comparatively wide pitch such as 5 pixels for sequentially cutting the partial image W of the predetermined size (Step S5), and inputs the partial image W to the first detector group 34 (Step S6). The first detector group 34 uses the detectors of the 36 types for face detection regarding the sequentially input partial image W, and the detection control unit 31 obtains a result R of the detection (Step S7). The detection control unit 31 judges whether the partial image W currently cut is the partial image to be subjected last to the detection (Step S8). In the case where a result of the judgment at Step S8 is affirmative, the procedure goes to Step S9. Otherwise, the procedure returns to Step S5 for newly cutting the partial image W. The face image candidate is roughly detected in this manner for the resolution-converted image S1'_i.

After the rough detection of the face image candidate, the detection control unit 31 judges whether the face image candidate has been detected (Step S9). If a result of the judgment is affirmative, the procedure goes to Step S10 for detection in the accurate mode. Otherwise, the detection for the currently selected resolution-converted image S1'_i is ended without the accurate mode detection, and the procedure goes to Step S14.

The detection control unit 31 sets the sub-window setting condition for the sub-window setting unit 33 in order to cause a region as a target of detection to be limited to the region of the predetermined range including the face image candidate and to change the detection mode to the accurate mode. In response, the sub-window setting unit 33 sets the sub-window around the face image candidate while sequentially moving the sub-window by the narrow pitch such as one pixel, for cutting the partial image W of the predetermined size (Step S10). The partial image W is then input to the second detector group 35 (Step S11). The second detector group 35 carries out the judgment by using the respective detectors for the 36 types comprising the 3 face directions (front, left, and right) and the 12 face orientations in 30-degree increment, and the detection control unit 31 obtains a result R (Step S12). The detection control unit 31 judges whether the partial image W currently cut is the partial image to be subjected last to the detection (Step S13). In the case where a result of the judgment is affirmative, the procedure goes to Step S14. Otherwise, the procedure returns to Step S10 for newly cutting the partial image W. The face image candidate is specified in this manner, and the true face image S2 in the resolution-converted image S1'_i is extracted.

After the detection in the accurate mode is completed for the region around the face image candidate, the detection control unit 31 judges whether the resolution-converted image S1'_i currently selected is the image to be subjected last to the detection (Step S14). In the case where a result of the judgment is affirmative, the detection processing ends, and the redundant detection judgment is carried out (Step S15). Otherwise, the procedure returns to Step S10 whereat the resolution-converted image selection unit 32 selects the resolution-converted image S1'_i-1 whose size is larger than the currently selected resolution-converted image S1'_I by one step, for further carrying out the face detection.

By repeating the procedure from Step S4 to Step S14 described above, the face image S2 can be detected in each of the resolution-converted images. FIG. 8 shows selection of the resolution-converted images in order of smaller size, and face detection is carried out therein.

At Step S15, the redundant detection judgment unit 40 classifies the face images S2 detected more than once into one face image, and the true face image S3 detected in the input image S0 is output.

The method of learning by the detectors (a method of generating the detectors) is described next. The learning is carries out for each of the types of the detectors, that is, for each of combinations of the face directions and the face orientations.

Figure 14:
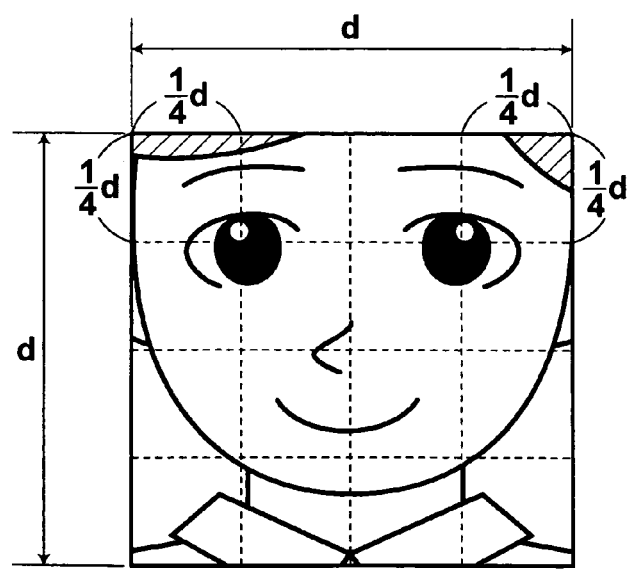
FIG. 14 shows a face sample image normalized so as to locate eyes at predetermined positions.

The sample image groups to be learned comprise face sample image groups including sample images representing faces and a non-face sample image group including sample images representing non-face subjects. Each of the sample images has been normalized to have a predetermined size, such as 32×32 pixels, for example. For the face sample images, the face directions therein are the same as the face directions to be judged by the respective detectors, and the face orientations are predetermined. For each of the face sample images are used a plurality of variations obtained by scaling the vertical and/or horizontal side(s) thereof by a factor ranging from 0.7 to 1.2 in 0.1 increment followed by rotation thereof in 3-degree increment ranging from −15 degrees to +15 degrees in the plane thereof. A size and a position of the face therein are normalized so as to locate the eyes at predetermined positions, and the scaling and the rotation described above are carried out with reference to the positions of eyes. For example, in a face sample image of d×d pixels representing a front-view face, the size and the position of the face are normalized so that the eyes can be located at positions d/4 inward from the upper left corner and the upper right corner of the image and d/4 downward therefrom, as shown in FIG. 14. At this time, the middle point between the eyes is used as the center of the scaling and the rotation.

First are prepared predetermined face sample image groups of 5 types in different combinations of the face directions and the face orientations. The predetermined face sample image groups of the 5 types comprise a "Front 0-degree" image group PF1 wherein the face direction is front and the face orientation is 0 degrees, a "Front 30-degree" image group PF30 wherein the face direction is front and the face orientation is rotated by 30 degrees clockwise (this rotation direction is referred to as the positive direction) from the image orientation, a "Right profile 0-degree" image group PR0 wherein the face direction corresponds to a right profile and the face orientation is 0 degrees, a "Right profile 30-degree" image group PR30 wherein the face direction corresponds to a right profile and the face orientation is rotated by 30 degrees, and a "Right profile 330-degree" image group PR330 wherein the face direction corresponds to a right profile and the face orientation is rotated by 330 degrees. Other face sample image groups corresponding to combinations of the face directions and the face orientations different from the 5 types are generated by carrying out at least one of mirror reversal processing and rotation processing in 90 degree increments on the face sample image groups of the 5 types.

Figure 15:
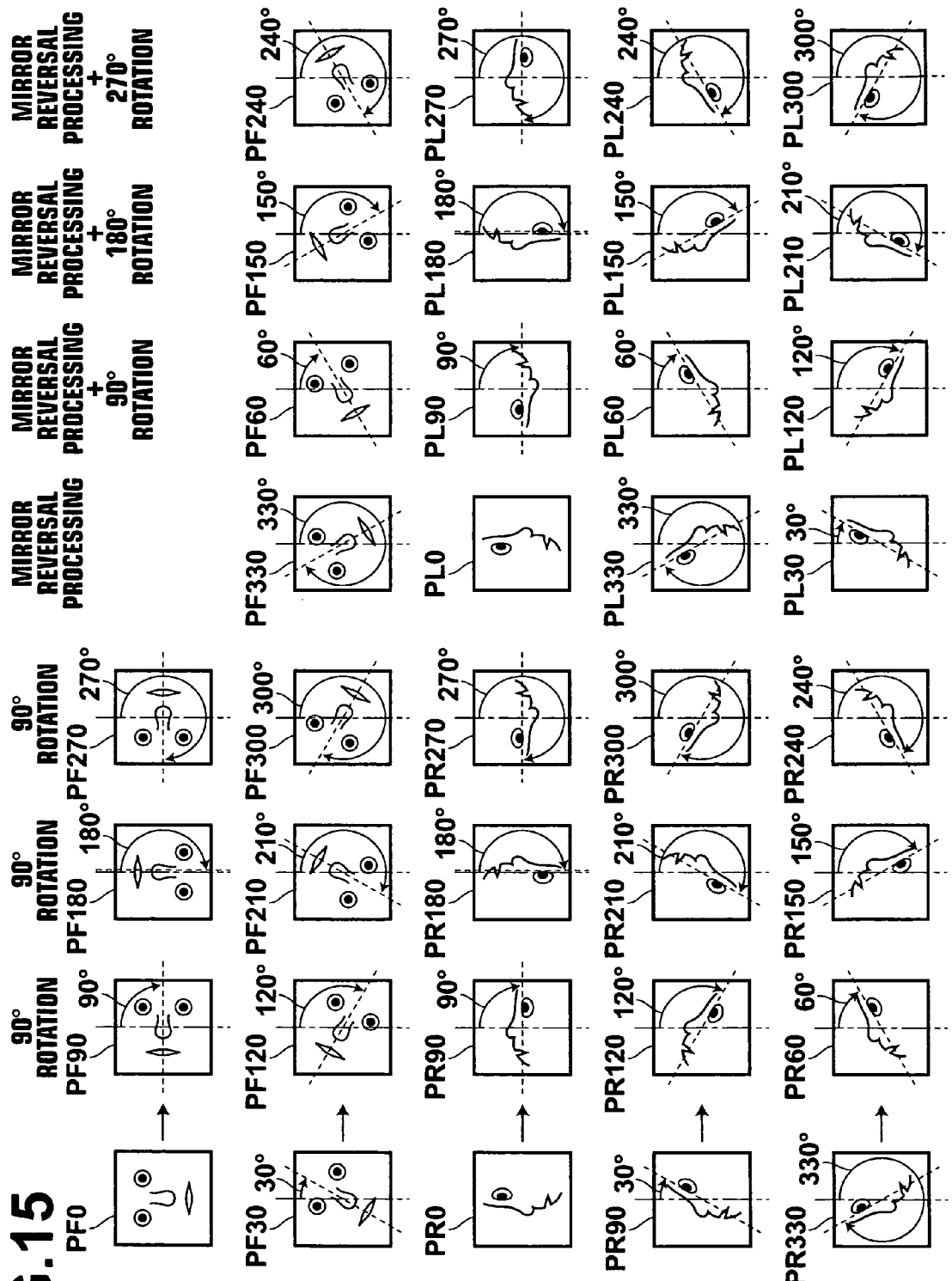
FIG. 15 shows predetermined face sample image groups of 5 types and other face sample image groups obtained by carrying out mirror reversal processing and rotation processing on the face sample image groups.

FIG. 15 shows the predetermined face sample image groups of the 5 types and the face sample image groups obtained by the mirror reversal processing and the rotation processing thereon.

From the image group PF0, a "Front 90-degree" image group PF90, a "Front 180-degree" image group PF180, and a "Front 270-degree" image group PF270 are obtained through rotation processing thereon by 90 degrees, 180 degrees, and 270 degrees, respectively.

A "Front 330-degree" image group PF330 is obtained from the "Front 30-degree" image group PF30 through mirror reversal processing thereon. By carrying out 90-degree rotation, 180-degree rotation, and 270-degree rotation on the "Front 30-degree" image group PF30 and on the "Front 330-degree" image group PF330, a "Front 120-degree" image group PF120, a "Front 210-degree" image group PF210, a "Front 300-degree" image group PF300, a "Front 60-degree" image group PF60, a "Front 150-degree" image group PF150, and a "Front 240-degree" image group PF240 are generated.

From the "Right profile 0-degree" image group PR0, a "Left profile 0-degree" image group PL0 is generated by carrying out mirror reversal processing thereon. Furthermore, execution of rotation processing by 90 degrees, 180 degrees, and 270 degrees on the "Right profile 0-degree" image group PR0 and the "Left profile 0-degree" image group PL0 generates a "Right profile 90-degree" image group PR90, a "Right profile 180-degree" image group PR180, a "Right profile 270-degree" image group PR270, a "Left profile 90-degree" image group PL90, a "Left profile 180-degree" image group PL180, and a "Left profile 270-degree" image group PL270.

Likewise, a "Left profile 330-degree" image group PL330, a "Right profile 120-degree" image group PR120, a "Right profile 210-degree" image group PR210, a "Right profile 300-degree" image group PR300, a "Left profile 60-degree" image group PL60, a "Left profile 150-degree" image group PL150, and a "Left profile 240-degree" image group PL240 are generated from the "Right profile 30-degree" image group PR30.

From the "Right profile 330-degree" image group PR330 are furthermore generated a "Left profile 30-degree" image group PL30, a "Right profile 60-degree" image group PR60, a "Right profile 150-degree" image group PR150, a Right profile 240-degree" image group PR240, a "Left profile 120-degree" image group PL120, a "Left profile 210-degree" image group PL210, and a "Left profile 300-degree" image group PL300.

By carrying out the mirror reversal processing and the rotation processing on the predetermined face sample image groups of the 5 types, the face sample image groups of the 31 types are generated. In this manner are obtained the face sample images of the 36 types in the combinations of the 3 face directions (that is, front, left profile, and right profile) and the 12 face orientations varying in 30-degree increment.

The reversal processing and the rotation processing in 90 degree increments do not need interpolation of the pixel values, unlike rotation processing by a degree other then every 90 degrees. Therefore, image conversion can be carried out fast and accurately, which is advantageous.

After the face sample image groups are prepared, the learning is carried out by the detectors with use of the face sample image groups of the 36 types and the non-face sample image group, and the detectors of the 36 types are generated. Hereinafter, the learning method is described specifically.

Figure 10:
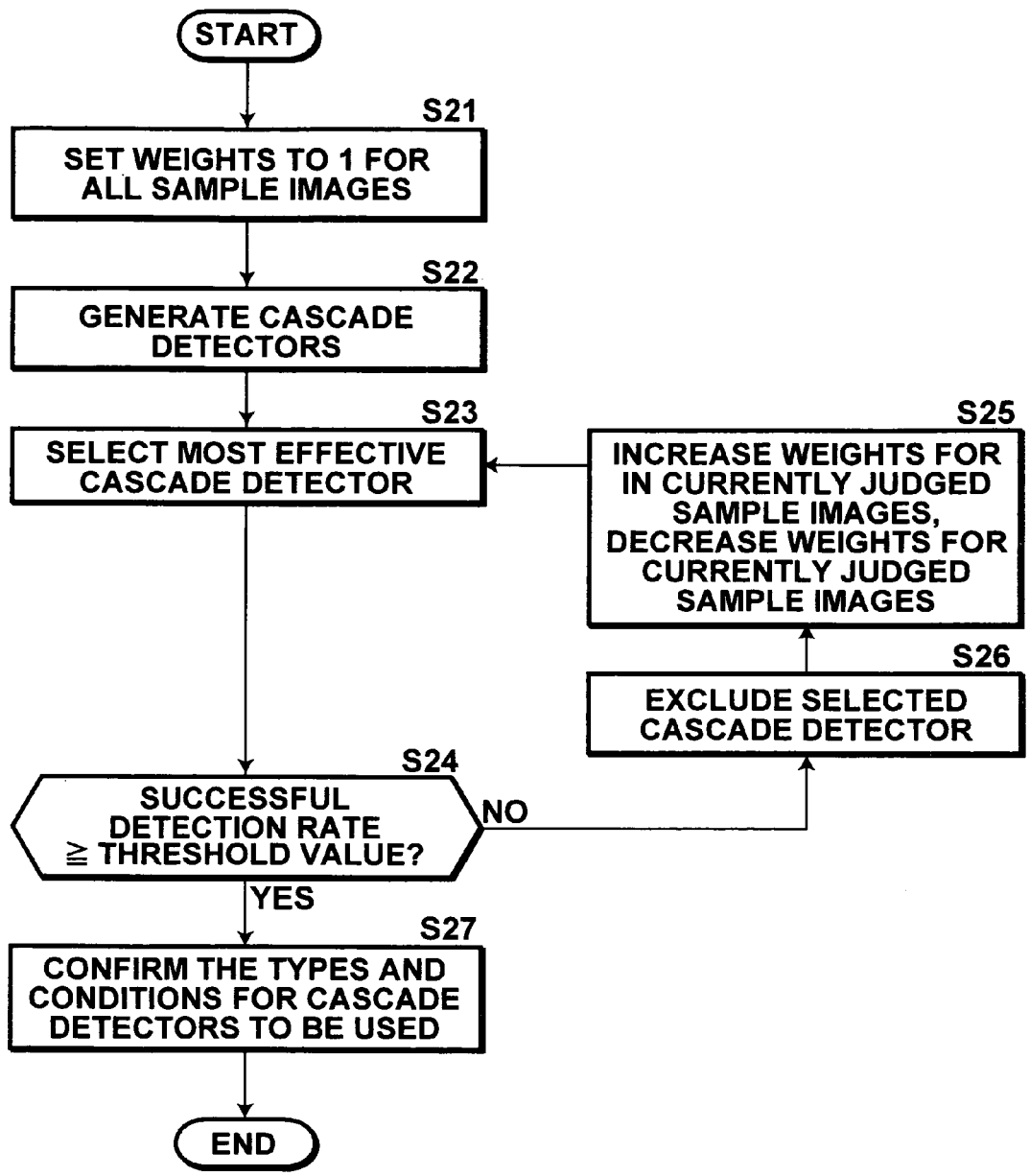
FIG. 10 is a flow chart showing a learning method for the detectors.

FIG. 10 is a flow chart showing the learning method for the detectors. A weight is assigned to each of the sample images comprising the face sample image groups and the non-face sample image group. The weights for the respective sample images are initially set to 1 (Step S21).

The weak classifiers are generated for respective pair groups of a plurality of types, each of which uses as one pair the 2 predetermined points set in the plane of each of the sample images and the reduced images thereof (Step S22). The weak classifiers respectively provide criteria for distinguishing a face image from a non-face image by using the combinations of the pixel value (luminance) differences each of which is calculated between the 2 points comprising each of the pairs in each of the pair groups set in each of the planes of the partial image W cut by the sub-window and the reduced images thereof. In this embodiment, a histogram for the combinations of the pixel-value differences is used as a basis for the score table for the corresponding weak classifier.

Figure 11:
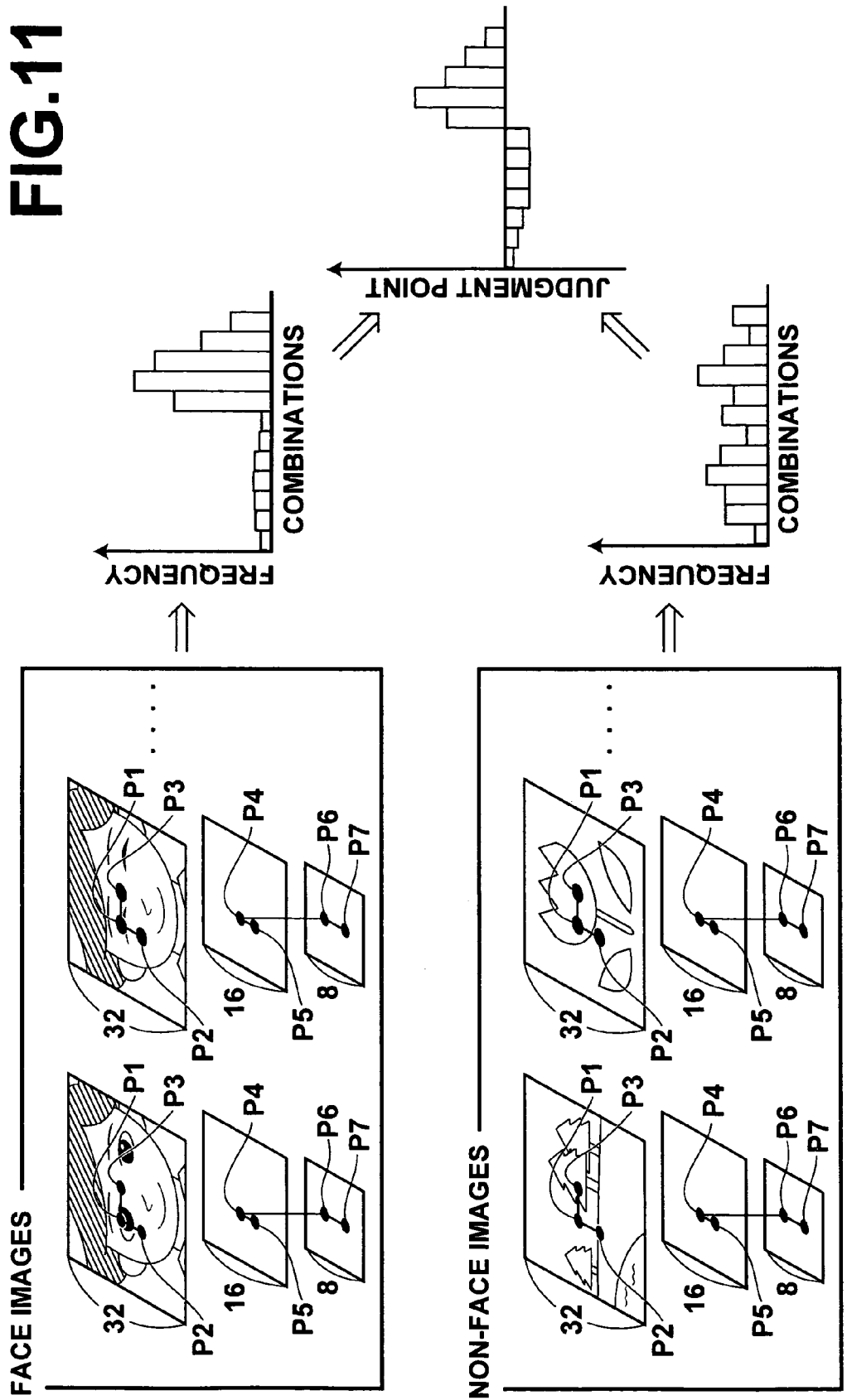
FIG. 11 shows how a histogram for one of the weak classifiers is found.

Generation of one of the detectors is described below with reference to FIG. 11. As shown on the left side of FIG. 11, the 2 points comprising each of the pairs in each of the pair groups used for generation of the detector are P1 and P2, P1 and P3, P4 and P5, P4 and P6, and P6 and P7. The point P1 is located at the center of the right eye in each of the face sample images while the point P2 is located in the right cheek therein. The point P3 is located between the eyebrows. The point P4 is located at the center of the right eye in the reduced image of 16×16 pixels generated through the 4-neighbor averaging of the corresponding sample image while the point P5 is located in the right cheek therein. The point P6 is located in the forehead in the reduced image of 8×8 pixels generated through further 4-neighbor averaging while the point P7 is located on the mouth therein. Coordinates of the 2 points comprising each of the pairs in each of the pair groups used for generation of the corresponding detector are the same for all the sample images. For the respective face sample images, the combinations of the pixel-value differences are found for the 5 pairs, and a histogram thereof is generated. The difference can take values of 65536 patterns in the case where the luminance is represented by 16-bit gradation. Therefore, although the combination of the differences depends on the number of luminance gradations, the whole combination of the differences can take patterns of 65536 to the power of 5, that is, the number of gradations to the power of the number of the pairs. Consequently, the learning and the detection require a large amount of samples, time, and memory. For this reason, in this embodiment, the differences are divided into ranges of appropriate width and quantized into n-values (such as n=100).

In this manner, the number of the combination of the differences can take patterns of n to the power of 5, which can reduce data representing the combination.

Likewise, for the sample images representing non-face subjects, a histogram is generated. For the non-face sample images are used the same positions as the positions of the predetermined 2 points (represented by the same reference codes P1 to P7) in each of the pairs in each of the face sample images. A histogram is then generated by converting a ratio of frequencies represented by the 2 histograms into logarithm, which is shown on the right side of FIG. 11. This histogram is used as the basis for the score table for the weak classifier. The value of the vertical axis of the histogram is hereinafter referred to as a judgment point. According to this weak classifier, an image showing distribution of the combination of the differences corresponding to a positive judgment point has a high probability of representing a face, and the larger the absolute value of the judgment point, the higher the probability becomes. Likewise, an image showing distribution of the combination of the differences corresponding to a negative judgment point has a high probability of representing a non-face subject, and the larger the absolute value of the judgment point, the higher the probability becomes. At Step S22, each of the weak classifiers in the form of the histogram is generated for the combination of the pixel-value differences each of which is calculated between the 2 predetermined points in each of the pairs comprising each of the pair groups of the different types.

Among the weak classifiers generated at Step S22, the most effective classifier is selected for judgment as to whether an image represents a face or a non-face subject. This selection is carried out in consideration of the weight for each of the sample images. In this example, a weighted successful detection rate is examined for each of the weak classifiers, and the weak classifier achieving the highest detection rate is selected (Step S23). More specifically, the weight for each of the sample images is 1 at Step S23 carried out for the first time, and the most effective classifier is selected as the detector having the largest number of sample images that have been judged correctly as the face images or the non-face images. At Step S23 carried out for the second time after Step S25 whereat the weight is updated for each of the sample images as will be described later, the sample images have the weights that is 1, or larger than 1, or smaller than 1. The sample images whose weights are larger than 1 contribute more to evaluation of the successful detection rate than the sample images whose weights are 1. Therefore, at Step S23 carried out for the second time or more, correct judgment of the sample images of the larger weights is more important than correct judgment of the sample images of the smaller weights.

Judgment is then made as to whether a successful detection rate (that is, a rate of agreement of a detection result as to whether each of the sample images represents a face image or a non-face image with a correct answer) achieved by a combination of all the weak classifiers having been selected exceeds a predetermined threshold value (Step S24). At this learning stage, the weak classifiers are not necessarily connected linearly. The sample images used for evaluation of the successful detection rate for the combination of the weak classifiers may be the sample images with the current weights or the sample images whose weights are the same. In the case where the rate exceeds the threshold value, the weak classifiers having been selected are sufficient for achieving a high probability of judgment as to whether an image is a face image or a non-face image. Therefore, the learning is completed. In the case where the rate is equal to or smaller than the threshold value, the procedure goes to Step S26 for adding another one of the weak classifiers to be used in combination of the weak classifiers having been selected.

At Step S26, the weak classifier selected at the immediately proceeding Step S23 is excluded so that the same weak classifier is not selected again.

The weights are then increased for the sample images that have not been judged correctly by the weak classifier selected at the immediately proceeding Step S23 while the weights for the sample images having been judged correctly are decreased (Step S25). The weights are increased or decreased for enhancing an effect of the combination of the weak classifiers by putting emphasis on selecting the weak classifier enabling proper judgment on the images that have not been judged properly by the weak classifiers having been selected.

The procedure then returns to Step S23 whereat the weak classifier that is the most effective among the remaining classifiers is selected with reference to the weighted successful detection rate.

If the successful detection rate confirmed at Step S24 exceeds the threshold value after selection of the weak classifier corresponding to the combination of the pixel-value differences each of which is calculated between the 2 predetermined points comprising each of the pairs in a specific one of the pair groups through repetition of the procedure from Step S23 to Step S26, the types of the weak classified used for the face detection and conditions therefor are confirmed (Step S27), and the learning is completed. The selected weak classifiers are linearly connected in order of higher weighted successful detection rate, and the weak classifiers comprise one detector. For each of the weak classifiers, the score table therefor is generated based on the corresponding histogram, for calculating the score according to the combination of the pixel-value differences. The histogram itself may be used as the score table. In this case, the judgment point in the histogram is used as the score.

By carrying out the learning for each of the face sample image groups, the detectors of the 36 types are generated.

In the case where the learning method described above is adopted, the weak classifiers are not necessarily limited to the weak classifiers in the form of histograms, as long as the criteria for judgment of a face image or a non-face image can be provided by using the combination of the pixel-value differences each of which is calculated between the 2 predetermined points comprising each of the pairs in a specific one of the pair groups. For example, the weak classifiers may be in the form of binary data, threshold values, or functions. Even in the case where the form of histogram is used, a histogram showing distribution of the differences between the 2 histograms shown in the middle of FIG. 11 may be used instead.

The method of learning is not necessarily limited to the method described above, and another machine learning method such as a method using a neural network may also be used.

AS has been described above, according to the method related to the embodiment of the learning method of the present invention for the detectors, one or more of the face sample image groups of the different types corresponding to the different combinations of the face directions and the face orientations is/are subjected to the mirror reversal processing and the rotation processing in 90 degree increments, and the face sample image groups different from the originally prepared face sample image groups are generated in the different combinations of the face directions and the face orientations, for augmenting the types of the face sample image groups. By providing the face sample image groups for the learning by the detectors, the learning can be carried out by the detectors of more types with use of the sample image groups of a few types, which leads to efficient face detection.

According to the face detection system as the first embodiment of the present invention adopting the first face detection apparatus of the present invention, whether the target image is a face image can be judged by using the detectors having learned according to the learning method of the present invention. Therefore, the amount of time necessary for the learning by the detectors can be shortened, which realizes efficient face detection.

A second embodiment of the present invention is described next. The second embodiment is a face detection system adopting the second face detection apparatus of the present invention. Like the first embodiment, the face detection system in the second embodiment detects a face included in a digital image regardless of a position, size, direction, orientation, and rotation thereof. The face detection system in the second embodiment also has a multi-resolution conversion unit 10, a local normalization unit 20, a face detection unit 30, and a redundant detection judgment unit 40 as in the first embodiment shown in FIG. 1. However, a sub-window setting unit 33, a first detector group 34, and a second detector group 35 comprising the face detection unit 30 are different from the first embodiment in terms of functions and configurations thereof.

In the second embodiment, the sub-window setting unit 33 carries out at least one of reversal processing and rotation processing in 90 degree increments on a partial image W cut by a sub-window. More specifically, an "Original 90-degree" image W_90 obtained by 90-degree rotation of the partial image W, an "Original 180-degree" image W_180 obtained by 180-degree rotation of the partial image W, an "Original 270-degree" image W_270 obtained by 270-degree rotation of the partial image W, a "Reversed 0-degree" image W_T0 obtained by mirror reversal processing on the partial image W, a "Reversed 90-degree" image W_T90 obtained by 90-degree rotation processing on the "Reversed 0-degree" image W_T0, a "Reversed 180-degree" image W_T180 obtained by 180-degree rotation processing on the "Reversed 0-degree" image W_T0, and a "Reversed 270-degree" image W_T270 obtained by 270-degree rotation processing on the "Reversed 0-degree" image W_T0 are generated, and the images of these 8 types including the original partial image W are used as detection targets.

Figure 16:
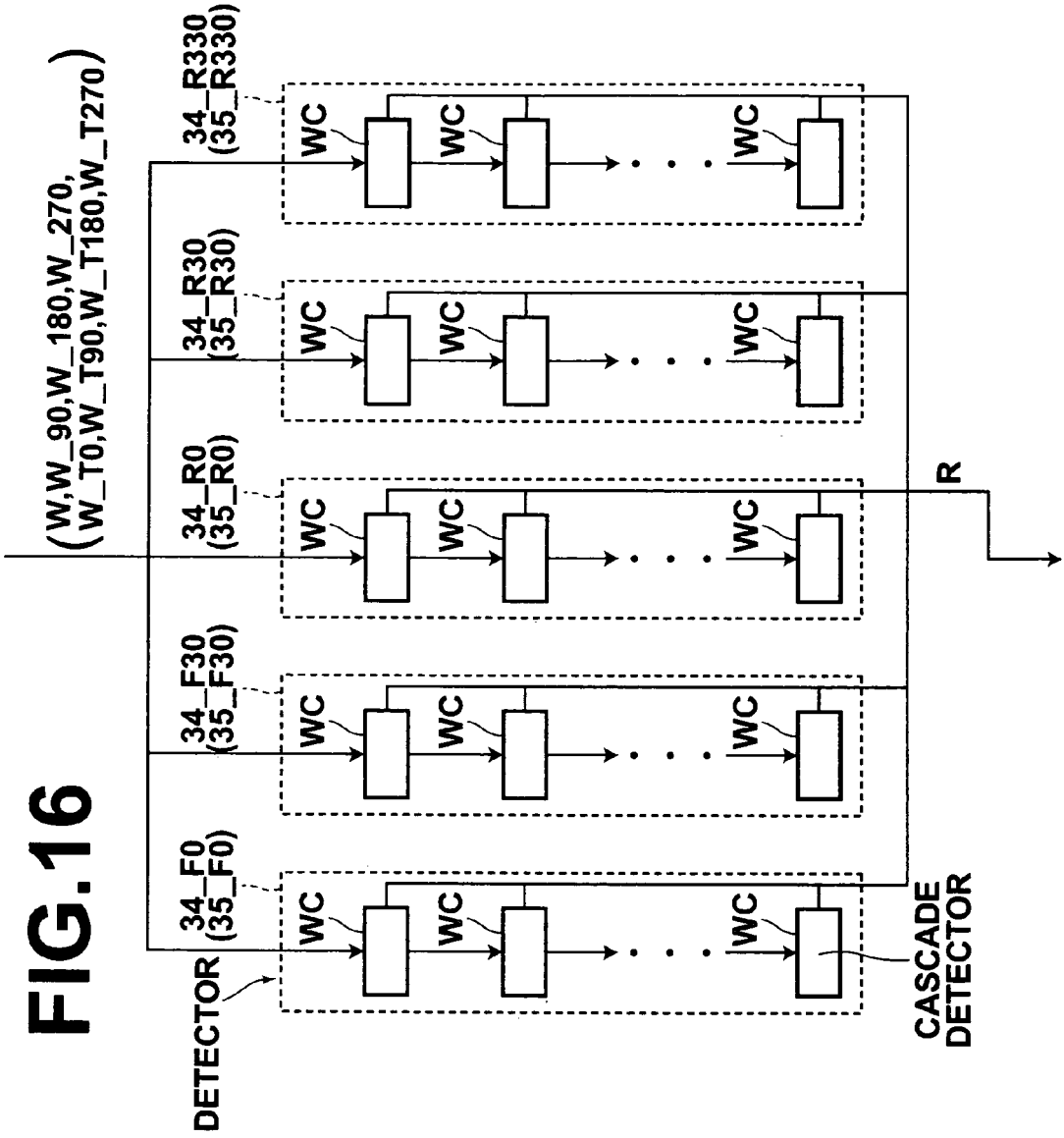
FIG. 16 shows the configuration of first and second detector groups in a second embodiment.

The first and second detector groups 34 and 35 respectively comprise detectors of predetermined 5 types corresponding to different face directions and orientations. More specifically, as shown in FIG. 16, the first detector group 34 comprises a "Front 0-degree" detector 34_F0, a "Front 30-degree" detector 34_F30, a "Right profile 0-degree" detector 34_R0, a "Right profile 30-degree" detector 34_R30, and a "Right profile 330-degree" detector 34_R330. Likewise, the second detector group 35 comprises a "Front 0-degree" detector 35_F0, a "Front 30-degree" detector 35_F30, a "Right profile 0-degree" detector 35_R0, a "Right profile 30-degree" detector 35_R30, and a "Right profile 330-degree" detector 35_R330. The detectors are generated according to the learning method using the face sample image groups described above.

Figure 17:
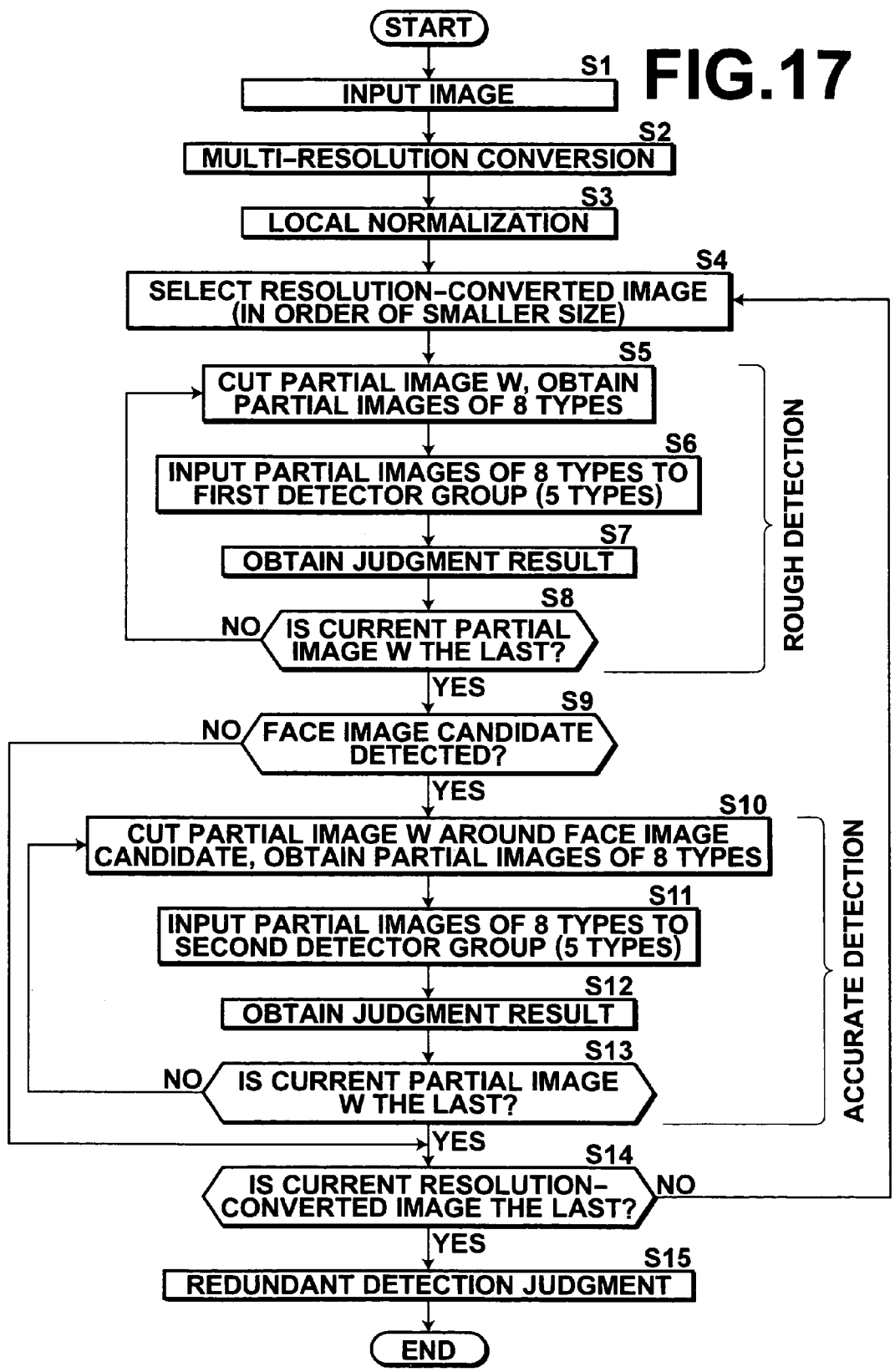
FIG. 17 is a flow chart showing a procedure carried out in a face detection system 1 in the second embodiment.
Figure 18:
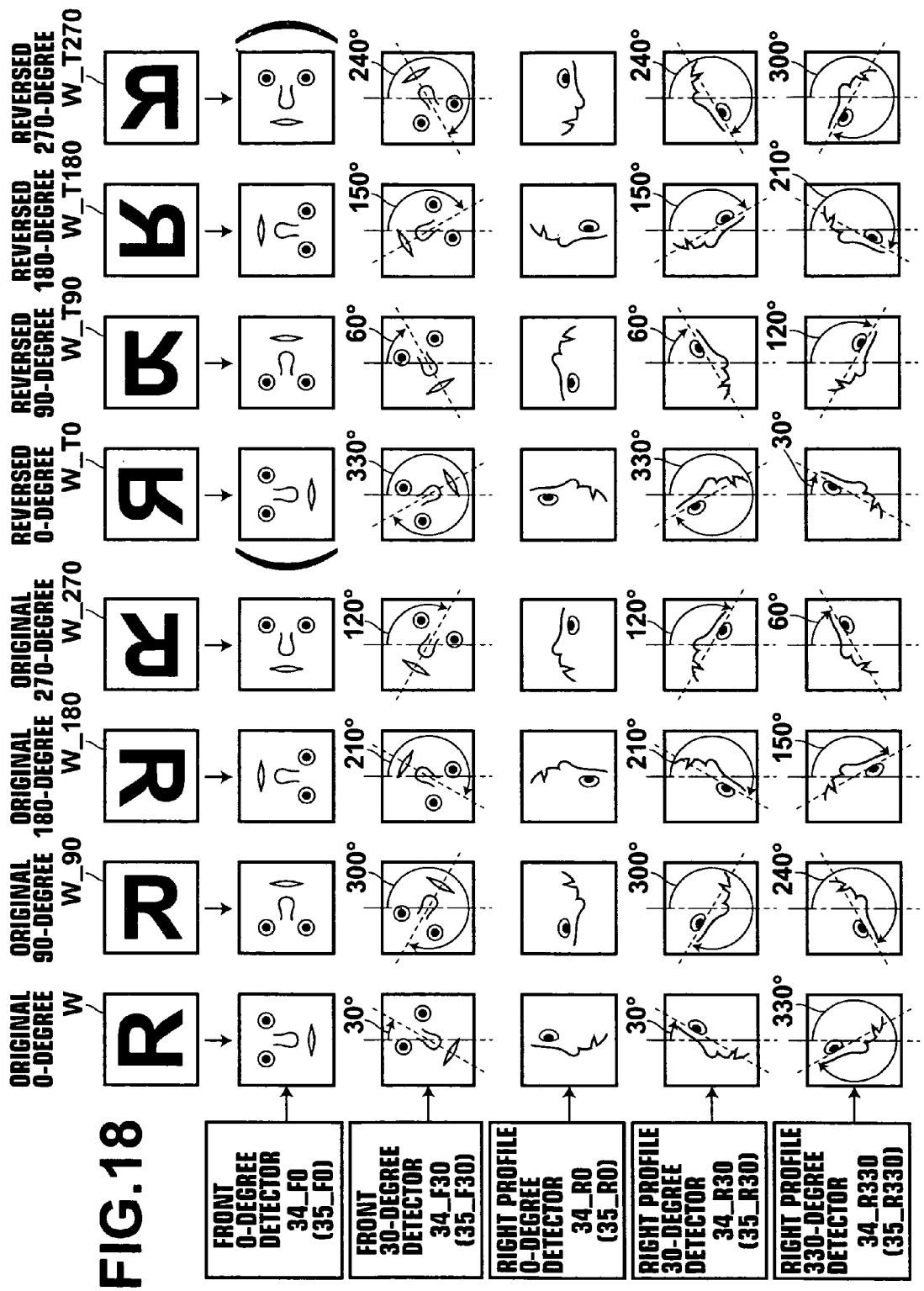
FIG. 18 shows states (directions and orientations) of faces detectable by combinations of the types of detectors and the types of images input to the detectors.

FIG. 17 is a flow chart showing a processing flow in the face detection system. As shown in FIG. 17, the image S0 is input to the multi-resolution conversion unit 10 (Step S1), and the size thereof is converted to the predetermined size for generating the image S0' of the predetermined size. The resolution-converted image group S1 comprising the plurality of resolution-converted images is generated through reduction of the size of the image S0' to every 2 to the power of −⅓ (Step S2). The local normalization unit 20 carries out the local normalization processing entirely on each of the images in the resolution-converted image group S1, and the resolution-converted image group S1' having been subjected to the local normalization processing is obtained (Step S3). In the face detection unit 30, a resolution-converted image selection unit 32 instructed by a detection control unit 31 selects the predetermined one of the images S1'_i in order of smaller image size from the resolution-converted image group S1' (Step S4). The detection control unit 31 then sets the sub-window setting condition for the sub-window setting unit 33 for causing the detection mode to be the rough detection mode, and the sub-window setting unit 33 sequentially cuts the partial image W of the predetermined size while moving the sub-window by the wider pitch. The partial images of the 8 types are then generated by carrying out the mirror reversal processing and the rotation processing in 90 degree increments on the partial image W (Step S5), and the partial images W are input to the first detector group 34 (Step S6). For each of the partial images W of the 8 types input sequentially, the first detector group 34 carries out the judgment regarding the faces of the 36 types comprising the 3 face directions (that is, front, left profile, and right profile) and the 12 orientations in every 30 degrees, by using the detectors of the 5 types (that is, 34_F0, 34_F30, 34_R0, 34_R30, and 34_R330) whose face directions and orientations to judge are "front 0-degree", "front 30-degree", "right profile 0-degree", "right profile 30-degree" and "right profile 330-degree". The detection control unit 31 obtains the judgment result R (Step S7). FIG. 18 shows states (the directions and the orientations) of faces that can be judged by respective combinations of the types of the detectors and the types of the images input thereto. In the case where the target image is an image representing a front-view face in the orientation of any one of 0, 90, 180, and 270 degrees, the detection result from the detector 34_F0 does not change if the image obtained by mirror reversal processing on the target image is input thereto. Therefore, in order not to carry out such unnecessary processing, the 4 images generated through the mirror reversal processing are not input to the detector 34_F0. The detection control unit 31 judges whether the currently cut partial image W is the image to be subjected last to the detection (Step S8). If a result of the judgment at Step S8 is affirmative, the procedure goes to Step S9. In the case where the result is negative, the procedure returns to Step S5 for newly cutting the partial image W. The face image candidate is roughly detected in this manner for the resolution-converted image S1'_i.

After the rough detection of the face image candidate, the detection control unit 31 judges whether the face image candidate has been detected (Step S9). If a result of the judgment is affirmative, the procedure goes to Step S10 for detection in the accurate mode. Otherwise, the detection for the currently selected resolution-converted image S1'_i is ended without the accurate-mode detection, and the procedure goes to Step S14.

The detection control unit 31 sets the sub-window setting condition for the sub-window setting unit 33 in order to cause the region as a target of detection to be limited to the region of the predetermined size including the face image candidate and to change the mode to the accurate mode. In response, the sub-window setting unit 33 sets the sub-window around the face image candidate while sequentially moving the sub-window by the narrow pitch, for cutting the partial image W of the predetermined size. The partial image W is subjected to the mirror reversal processing and the rotation processing in 90 degree increments, and the images of the 8 types are obtained from the partial image W (Step S10). The partial images W are then input to the second detector group 35 (Step S11). For each of the partial images W of the 8 types input sequentially, the second detector group 35 carries out the judgment regarding the faces of the 36 types comprising the 3 face directions (that is, front, left profile, and right profile) and the 12 orientations in 30-degree increment, by using the detectors of the 5 types (that is, 35_F0, 35_F30, 35_R0, 35_R30, and 35_R330) whose face directions and orientations to judge are "front 0-degree", "front 30-degree", "right profile 0-degree", "right profile 30-degree" and "right profile 330-degree". The detection control unit 31 obtains the judgment result R (Step S12). For the same reason as for the first detector group 34, the images of the 4 types generated through the mirror reversal processing are not input to the "Front 0-degree" detector 35_F0. The detection control unit 31 judges whether the currently cut partial image W is the image to be subjected last to the detection (Step S13). If a result of the judgment at Step S13 is affirmative, the procedure goes to Step S14. In the case where the result is negative, the procedure returns to Step S10 for newly cutting the partial image W. The face image candidate is specified in this manner, and the true face image S2 in the resolution-converted image S1'_i is extracted.

After the detection in the accurate mode is completed for the region around the face image candidate, the detection control unit 31 judges whether the resolution-converted image S1'_i currently selected is the image to be subjected last to the detection (Step S14). In the case where the result of the judgment is affirmative, the detection processing ends and the redundant detection judgment is carried out (Step S15). Otherwise, the procedure returns to Step S10 whereat the resolution-converted image selection unit 32 selects the resolution-converted image S1'_i-1 whose size is larger than the currently selected resolution-converted image S1'_i by one step, for further carrying out the face detection thereon.

By repeating the procedure from Step S4 to Step S14 described above, the face image S2 can be detected in each of the resolution-converted images.

At Step S15, the redundant detection judgment unit 40 classifies the face images detected more than once into one face image, and the true face image S3 detected in the input image S0 is output.

As has been described above, according to the face detection system as the second embodiment of the present invention adopting the second face detection apparatus of the present invention, the images used for the detection are newly generated by carrying out the mirror reversal processing and the rotation processing in 30-degree increment on the original target image, and the judgment as to whether each of the images is a face image in the predetermined face direction and orientation is carried out by applying the detectors of the predetermined types thereto. Therefore, the judgment can be made on the faces of more types by the detectors of few types, which realizes efficient face detection.

The face detection systems in the first and second embodiments have the following effects, in addition to the effects described above.

According to the face detection system in the first embodiment, the states of faces of the 36 types can be judged by directly inputting the partial image as the target image cut in each of the resolution-converted images to the detector groups without mirror reversal processing or rotation processing thereon. Therefore, an amount of calculations necessary for mirror reversal processing and rotation processing is small, which is beneficial.

According to the face detection system in the second embodiment, only the detectors of the 5 types can judge the states of faces of the 36 types. Therefore, a memory necessary for storing the detectors in the face detection system can be small.

In order to sufficiently derive the effects described above, the two systems may be switched from one to the other depending on a purpose.

Figure 19:
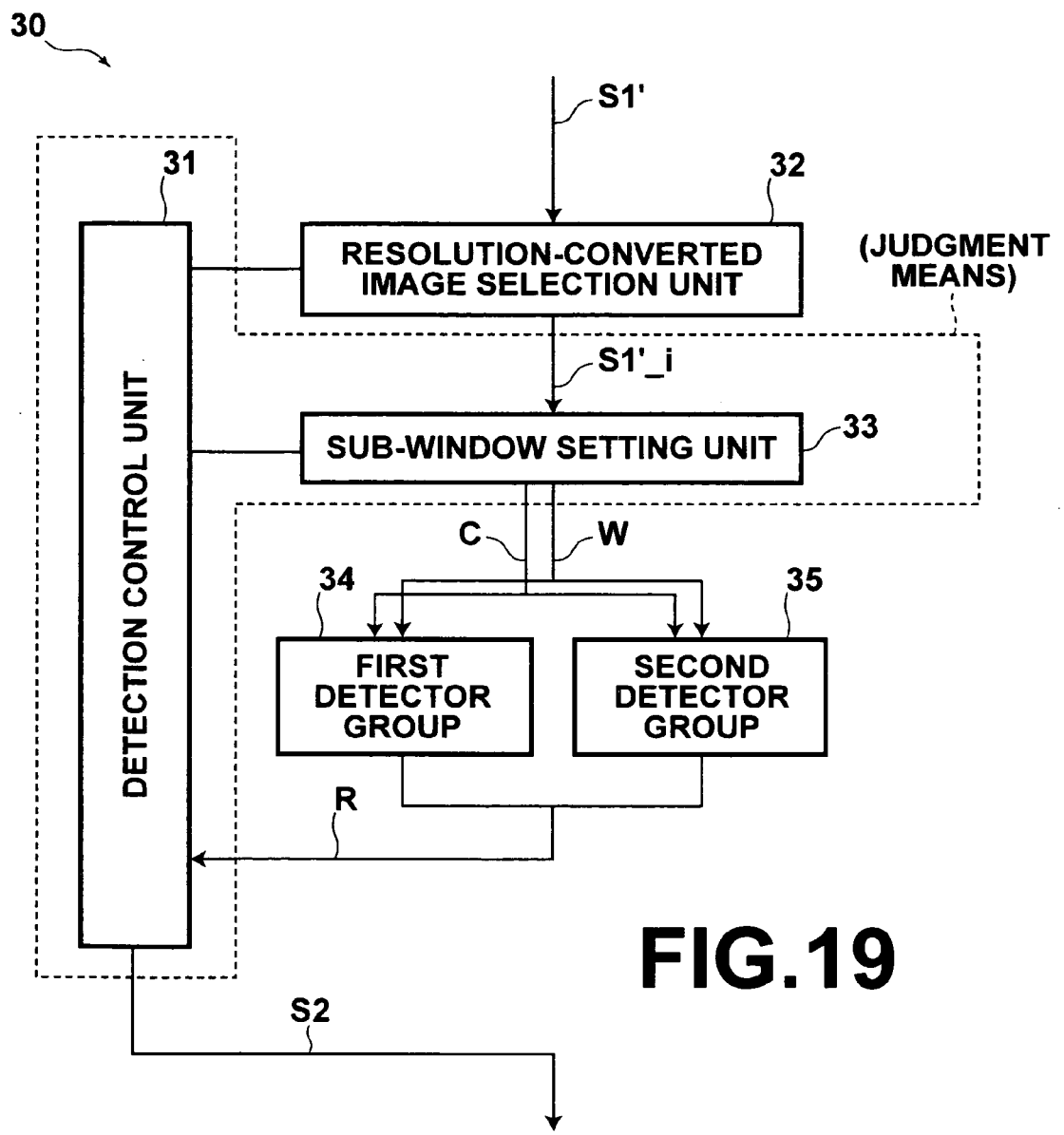
FIG. 19 is a block diagram showing the configuration of a face detection unit 30 in a third embodiment.

A third embodiment of the present invention will be described next. In the third embodiment, the third face detection apparatus of the present invention is adopted in a face detection system. Like the first and second embodiments, the face detection system has a multi-resolution conversion unit 10, a local normalization unit 20, a face detection unit 30, and a redundant detection judgment unit 40 as shown in FIG. 1. However, as shown in FIG. 19, a sub-window setting unit 33, a first detector group 34, and a second detector group 35 comprising the face detection unit 30 are different from the first and second embodiments in terms of functions and configurations thereof.

The first and second detector groups 34 and 35 respectively comprise the predetermined detectors of the 5 types corresponding to different face directions and orientations, as in the second embodiment. More specifically, as shown in FIG. 16, the first detector group 34 comprises a "Front 0-degree" detector 34_F0, a "Front 30-degree" detector 34_F30, a "Right profile 0-degree" detector 34_R0, a "Right profile 30-degree" detector 34_R30, and a "Right profile 330-degree" detector 34_R330. Likewise, the second detector group 35 comprises a "Front 0-degree" detector 35_F0, a "Front 30-degree" detector 35_F30, a "Right profile 0-degree" detector 35_R0, a "Right profile 30-degree" detector 35_R30, and a "Right profile 330-degree" detector 35 R330. Each of the detectors calculates characteristic quantities related to density of predetermined pixels in the partial image W as a target of detection. For example, each of the detectors calculates as the characteristic quantities the differences in density between pixels at predetermined positions as shown in FIG. 7, and judges whether the partial image W is a face image in the predetermined face direction and orientation according to the characteristic quantities. At this time, each of the detectors changes the positions (coordinates) of the pixels in the partial image W to be used for calculation of the characteristic quantities, according to change pattern information C input from the sub-window setting unit 33 as will be described later. Each of the detectors then calculates the characteristic quantities from the density of the pixels at the changed positions, and judges whether the partial image W is a face image in the predetermined face direction and orientation.

The sub-window setting unit 33 inputs the partial image W cut by the sub-window to the first detector group 34 in the case of rough detection for face image candidate, or to the second detector group 35 in the case of accurate detection for specifying the face image candidate, as in the first and second embodiments. At this time, the sub-window setting unit 33 inputs to the detector groups the information representing the predetermined change patterns indicating the positions to which the pixels used for calculation of the characteristic quantities are moved. More specifically, as the change patterns of the pixel positions used for calculation of the characteristic quantities, the sub-window setting unit 33 inputs to the detector groups all or a part of the change pattern information C of 8 types as shown in FIG. 20 representing movements comprising combinations of mirror reversal processing and/or rotation processing in 90-degree increment. Points P1 to P3 in FIG. 20 show the pixels to be used for calculation of the characteristic quantities, and the pixels corresponding to each other in the patterns are represented by the same reference codes.

Each of the detectors comprising each of the detector groups calculates the characteristic quantities by using the pixel positions changed according to the patterns of the 8 types, and carries out the judgment based on the characteristic quantities. This process corresponds to the process in the second embodiment wherein the reversed/rotated images of the 8 types generated through the mirror reversal processing and/or rotation processing in 90 degree increments on the partial image W (that is, the "Original 90-degree" image W_90 obtained by 90-degree rotation of the partial image W, the "Original 180-degree" image W_180 obtained by 180-degree rotation of the partial image W, the "Original 270-degree" image W_270 obtained by 270-degree rotation of the partial image W, the "Reversed 0-degree" image W_T0 obtained by mirror reversal processing on the partial image W, the Reversed 90-degree" image W_T90 obtained by 90-degree rotation processing on the "Reversed 0-degree" image W_T0, the Reversed 180-degree" image W_T180 obtained by 180-degree rotation processing on the "Reversed 0-degree" image W_T0, and the Reversed 270-degree" image W_T270 obtained by 270-degree rotation processing on the "Reversed 0-degree" image W_T0) are input to the detector groups and the judgment is made respectively by the detector groups.

FIG. 21 is a flow chart showing a procedure carried out in the face detection system. As shown in FIG. 21, the image S0 is input to the multi-resolution conversion unit 10 (Step S1), and the size thereof is converted to the predetermined size for generating the image S0' having the predetermined size. The resolution-converted image group S1 comprising the plurality of resolution-converted images is generated through reduction of the size of the image S0' to every 2 to the power of $-\frac{1}{3}$ (Step S2). The local normalization unit 20 carries out local normalization processing entirely on each of the images in the resolution-converted image group S1, and the resolution-converted image group S1' having been subjected to the local normalization is obtained (Step S3). In the face detection unit 30, a resolution-converted image selection unit 32 instructed by a detection control unit 31 selects the predetermined one of the images S1'_i in order of smaller image size from the resolution-converted image group S1' (Step S4). The detection control unit 31 then sets the sub-window setting condition for the sub-window setting unit 33 for causing the detection mode to be the rough detection mode, and the sub-window setting unit 33 sequentially cuts the partial image W of the predetermined size while moving the sub-window by the wider pitch. The partial image W is input to the first detector group 34 (Step S5). At the same time, the sub-window setting unit 33 inputs the change pattern information C of the 8 types one by one to the first detector group 34, for the partial image W (Step S6). The detectors of the predetermined 5 types comprising the first detector group 34 (that is, 34_F0, 34_F30, 34_R0, 34_R30, and 34_R330) whose face directions and orientations to judge are "front 0-degree", "front 30-degree", "right profile 0-degree", "right profile 30-degree" and "right profile 330-degree" change the positions of the pixels used for calculation of the characteristic quantities according to the change pattern information C input sequentially, and calculate the characteristic quantities from density of the pixels whose positions have been changed. The detectors respectively carry out the judgment regarding faces of the 36 types comprising the 3 face directions (that is, front, left profile, and right profile) and the 12 orientations in every 30 degrees. The detection control unit 31 obtains the judgment result R (Step S7). The detection control unit 32 judges whether the currently cut partial image W is the image to be subjected last to the detection (Step S8). If a result of the judgment at Step S8 is affirmative, the procedure goes to Step S9. In the case where the result is negative, the procedure returns to Step S5 for newly cutting the partial image W. The face image candidate is roughly detected in this manner for the resolution-converted image S1'_i.

After the rough detection of the face image candidate, the detection control unit 31 judges whether the face image candidate has been detected (Step S9). If a result of the judgment is affirmative, the procedure goes to Step S10 for detection in the accurate mode. Otherwise, the detection for the currently selected resolution-converted image S1'_i is ended without the accurate mode detection, and the procedure goes to Step S14.

The detection control unit 31 sets the sub-window setting condition for the sub-window setting unit 33 in order to cause the region as a target of detection to be limited to the region of the predetermined size including the face image candidate and to change the detection mode to the accurate mode. In response, the sub-window setting unit 33 sets the sub-window around the face image candidate while sequentially moving the sub-window by the narrow pitch, for cutting the partial image W of the predetermined size. The partial image W is then input to the second detector group 35 (Step S10). At the same time, the sub-window setting unit 33 inputs the change pattern information C of the 8 types one by one to the second detector group 35, for the partial image W (Step S11). The detectors of the predetermined 5 types comprising the second detector group 35 (that is, 35_F0, 35_F30, 35_R0, 35_R30, and 35_R330) whose face directions and orientations to judge are "front 0-degree", "front 30-degree", "right profile 0-degree", "right profile 30-degree" and "right profile 330-degree" change the positions of the pixels used for calculation of the characteristic quantities according to the change pattern information C input sequentially, and calculate the characteristic quantities from density of the pixels whose positions have been changed. The detectors respectively carry out the judgment regarding faces of the 36 types comprising the 3 face directions (that is, front, left profile, and right profile) and the 12 orientations in every 30 degrees. The detection control unit 31 obtains the judgment result R (Step S12).

The detection control unit 31 judges whether the partial image W currently cut is the partial image to be subjected last to the detection (Step S13). In the case where a result of the judgment is affirmative, the procedure goes to Step S14. Otherwise, the procedure returns to Step S10 for newly cutting the partial image W. The face image candidate is specified in this manner, and the true face image S2 in the resolution-converted image S1'_i is extracted.

After the detection in the accurate mode is completed for the region around the face image candidate, the detection control unit 31 judges whether the resolution-converted image S1'_i currently selected is the image to be subjected last to the detection (Step S14). In the case where a result of the judgment is affirmative, the detection processing ends, and the redundant detection judgment is carried out (Step S15). Otherwise, the procedure returns to Step S10 whereat the resolution-converted image selection unit 32 selects the resolution-converted image S1'_i-1 whose size is larger than the currently selected resolution-converted image Si'_i by one step, for further carrying out the face detection.

By repeating the procedure from Step S4 to Step S14 described above, the face image S2 can be detected in each of the resolution-converted images.

At Step S15, the redundant detection judgment unit 40 classifies the face images S2 detected more than once into one face image, and the true face image S3 detected in the input image S0 is output.

As has been described above, according to the face detection system as the third embodiment of the present invention adopting the third face detection apparatus of the present invention, the detectors of the predetermined types are prepared for the different combinations of face directions and orientations to judge so that judgment can be made as to whether the detection target image is an image representing a face in the predetermined direction and orientation, based on the characteristic quantities related to density of the predetermined pixels in the target image. Each of the detectors carries out the judgment by calculating the characteristic quantities by using the pixels at the original positions and at the positions moved by mirror reversal processing and/or rotation processing in 90 degree increments. Therefore, the detectors of a few types can judge the faces of more types. In addition, a process of mirror reversal processing/rotation processing on the target image itself, which is a time-consuming process, is not necessary. In this manner, efficient and fast face detection can be realized.

Although the face detection systems related to the embodiments of the present invention have been described above, programs for causing a computer to execute the procedures carried out by the face detection apparatuses of the present invention in the face detection systems are also an embodiment of the present invention. Furthermore, computer-readable recording media storing the programs are also an embodiment of the present invention.

What is claimed is:

1. A learning method for detectors that judge whether a detection target image is a face image, the method comprising the steps of:

obtaining face sample image groups each comprising face sample images in which the directions and the orientations of faces are substantially the same, for N types of combinations of the directions and the orientations that are different from each other and predetermined;

obtaining N+M types of face sample image groups by generating M other types of face sample image groups wherein combinations of the directions and the orientations are different from the directions and orientations of the N types of face sample image groups, through mirror reversal processing and/or rotation processing in 90 degree increments on at least one of the N types of face sample image groups; and obtaining N+M types of the detectors for which combinations of directions and orientations of faces to be detected respectively correspond to the N+M types of face sample image groups, by causing the respective detectors to learn a characteristic of faces corresponding to the N+M types of face sample image groups.

2. A face detection method for judging whether a detection target image is a face image, the method comprising the steps of:

obtaining face sample image groups each comprising face sample images in which the directions and the orientations of faces are substantially the same, for N types of combinations of the directions and the orientations that are different from each other and predetermined;

obtaining N+M types of face sample image groups by generating M other types of face sample image groups wherein combinations of the directions and the orientations are different from the directions and orientations of the N types of face sample image groups, through mirror reversal processing and/or rotation processing in 90 degree increments on at least one of the N types of face sample image groups; and judging whether the detection target image is a face image in any one of combinations of predetermined face directions and predetermined face orientations the number of which is larger than N, by applying to the detection target image N+M types of detectors that judge whether a detection target image is a face image, the detectors having been obtained by causing the respective detectors to learn a characteristic of faces corresponding to the N+M types of face sample image groups, and combinations of directions and orientations of faces for the detectors to detect respectively corresponding to the N+M types of face sample images.

3. A face detection apparatus for judging whether a detection target image is a face image, the apparatus comprising:

N+M types of detectors generated according to the steps of:

obtaining face sample image groups each comprising face sample images in which the directions and the orientations of faces are substantially the same, for N types of combinations of the directions and the orientations that are different from each other and predetermined;

obtaining N+M types of face sample image groups by generating M other types of face sample image groups wherein combinations of the directions and the orientations are different from the directions and orientations of the N types of face sample image groups, through mirror reverse processing and/or rotation processing in 90 degree increments on at least one of the N types of face sample image groups; and obtaining the N+M types of detectors for which combinations of directions and orientations of faces to be detected respectively correspond to the N+M types of face sample image groups, by causing the respective detectors to learn a characteristic of faces corresponding to the N+M types of face sample image groups; and judgment means for judging whether the detection target image is a face image in any one of the N+M types of combinations of directions and orientations, by applying the N+M types of detectors to the detection target image.

4. A computer-readable recording medium storing a program for causing a computer to carry out learning processing for detectors that judge whether a detection target image is a face image, the program comprising the procedures of:

obtaining face sample image groups each comprising face sample images in which the directions and the orientations of faces are substantially the same, for N types of combinations of the directions and the orientations that are different from each other and predetermined;

obtaining N+M types of face sample image groups by generating M other types of face sample image groups wherein combinations of the directions and the orientations are different from the directions and orientations of the N types of face sample image groups, through mirror reversal processing and/or rotation processing in 90 degree increments on at least one of the N types of face sample image groups; and obtaining N+M types of the detectors for which combinations of directions and orientations of faces to be detected respectively correspond to the N+M types of face sample image groups, by causing the respective detectors to learn a characteristic of faces corresponding to the N+M types of face sample image groups.

5. A computer-readable recording medium storing a program for causing a computer to carry out face detection processing for judging whether a detection target image is a face image, the program comprising the procedures of:

obtaining face sample image groups each comprising face sample images in which the directions and the orientations of faces are substantially the same, for N types of combinations of the directions and the orientations that are different from each other and predetermined;

obtaining N+M types of face sample image groups by generating M other types of face sample image groups wherein combinations of the directions and the orientations are different from the directions and orientations of the N types of face sample image groups, through mirror reversal processing and/or rotation processing in 90 degree increments on at least one of the N types of face sample image groups; and judging whether the detection target image is a face image in any one of combinations of predetermined face directions and orientations the number of which is larger than N, by applying to the detection target image N+M types of detectors that judge whether a detection target image is a face image, the detectors having been obtained by causing the respective detectors to learn a characteristic of faces corresponding to the N+M types of face sample image groups, and combinations of directions and orientations of faces for the detectors to detect respectively corresponding to the N+M types of face sample images.

6. A face detection method for judging whether a detection target image is a face image, the method comprising the steps of:

generating J types of reversed/rotated images by carrying out mirror reversal processing and/or rotation processing in 90 degree increments on the detection target image; and judging whether the detection target image and the J types of reversed/rotated images are face images by using K predetermined types of detectors having different combinations of directions and orientations of faces to be detected, whereby whether the detection target image is a face image is judged for predetermined combinations of face directions and face orientations the number of which is larger than K.

7. A face detection apparatus for judging whether a detection target image is a face image, the apparatus comprising:
image generation means for generating J types of reversed/rotated images by carrying out mirror reversal processing and/or rotation processing in 90 degree increments on the detection target image; and
judgment means for judging whether the detection target image and the J types of reversed/rotated images are face images by using K predetermined types of detectors corresponding to different combinations of directions and orientations of faces to judge, whereby whether the detection target image is a face image is judged for predetermined combinations of directions and orientations of faces the number of which is larger than K.

8. The face detection apparatus according to claim 7, wherein the K types of detectors are 2 types of detectors comprising:
a first front detector for which the face direction to judge is front and for which the face orientation to judge is the same as the orientation of the detection target image; and
a second front detector for which the face direction to judge is the front and for which the face orientation to judge is in an angle rotated by a predetermined degree from the orientation of the detection target image, whereby
the K types of detectors judge whether the respective images are face images regarding at least 3 up to 12 combinations of the face directions and the face orientations.

9. The face detection apparatus according to claim 8 wherein the predetermined angle is 30 degrees.

10. The face detection apparatus according to claim 7, wherein the K types of detectors are 3 types of detectors comprising:
a first profile detector for which the face direction to judge is either the right or the left and for which the face orientation to judge is the same as the orientation of the detection target image;
a second profile detector for which the face direction to judge is either the right or the left and for which the face orientation to judge is in an angle rotated by a predetermined degree from the orientation of the detection target image in the direction to turn up the face in the detection target image; and
a third profile detector for which the face direction to judge is either the right or the left and for which the face orientation to judge is in an angle rotated by a predetermined degree from the orientation of the detection target image in the direction to turn down the face in the detection target image, whereby
the K types of detectors judge whether the respective images are face images regarding at least 6 up to 24 combinations of the face directions and the face orientations.

11. The face detection apparatus according to claim 7, wherein the K types of detectors are 5 types of detectors comprising:
a first front detector for which the face direction to judge is front and for which the face orientation to judge is the same as the orientation of the detection target image;
a second front detector for which the face direction to judge is the front and for which the face orientation to judge is rotated by a predetermined degree from the orientation of the detection target image;
a first profile detector for which the face direction to judge is either the right or the left and for which the face orientation to judge is the same as the orientation of the detection target image;
a second profile detector for which the face direction to judge is either the right or the left and for which the face orientation to judge is rotated by a predetermined degree from the orientation of the detection target image in the direction to turn up the face in the detection target image; and
a third profile detector for which the face direction to judge is either the right or the left and for which the face orientation to judge is rotated by a predetermined degree from the orientation of the detection target image in the direction to turn down the face in the target image, whereby
the K types of detectors judge whether the respective images are face images regarding at least 9 up to 36 combinations of the face directions and the face orientations.

12. The face detection apparatus according to claim 7, wherein the K types of detectors have been obtained through learning K types of face sample image groups in each of which a face direction and a face orientation are substantially the same as a predetermined direction and as a predetermined orientation.

13. The face detection apparatus according to claim 12, wherein each of the face sample image groups comprises face sample images wherein the face orientation varies within a range of −15 degrees to +15 degrees from the predetermined orientation.

14. The face detection apparatus according to claim 7, wherein the detection target image has a square shape.

15. A computer-readable recording medium storing a program for causing a computer to execute face detection processing for judging whether a detection target image is a face image, the program comprising the procedures of:
generating J types of reversed/rotated images by carrying out mirror reversal processing and/or rotation processing in 90 degree increments on the detection target image; and
judging whether the detection target image and the J types of reversed/rotated images are face images by using K predetermined types of detectors having different combinations of directions and orientations of faces to be detected, whereby whether the detection target image is a face image is judged for predetermined combinations of face directions and orientations the number of which is larger than K.

16. A face detection method for judging whether a detection target image is a face image by using detectors that judge whether the detection target image is a face image representing a face in a predetermined direction and in a predetermined orientation according to a characteristic quantity related to density of a predetermined pixel in the detection target image, the method comprising the steps of:
preparing K predetermined types of the detectors corresponding to different combinations of face directions and face orientations; and
carrying out judgment by each of the detectors through calculation of the characteristic quantity for the case where a position of the predetermined pixel in the detection target image as a basis of the calculation of the characteristic quantity is a predetermined position and for the case where the position of the predetermined pixel is a position moved from the original position by mirror reversal processing and/or rotation processing in 90 degree increments thereon, whereby the judgment is made as to whether the detection target image is a face image regarding predetermined combinations of face directions and orientations the number of which is larger than K.

17. A face detection apparatus for judging whether a detection target image is a face image, the apparatus comprising:

K predetermined types of detectors corresponding to different combinations of face directions and orientations, for judging whether the detection target image is a face image representing a face in a predetermined direction and a predetermined orientation according to a characteristic quantity related to density of a predetermined pixel in the detection target image; and judgment means for carrying out judgment by each of the detectors through calculation of the characteristic quantity for the case where a position of the predetermined pixel in the detection target image as a basis of the calculation of the characteristic quantity is a predetermined position and for the case where the position of the predetermined pixel is a position moved from the original position by mirror reversal processing and/or rotation processing in 90 degree increments thereon, whereby the judgment is made as to whether the detection target image is a face image regarding predetermined combinations of face directions and face orientations the number of which is larger than K.

18. A computer-readable recording medium storing a program for causing a computer to function as:

K predetermined types of detectors corresponding to different combinations of face directions and orientations, for judging whether the detection target image is a face image representing a face in a predetermined direction and a predetermined orientation according to a characteristic quantity related to density of a predetermined pixel in the detection target image; and judgment means for carrying out judgment by each of the detectors through calculation of the characteristic quantity for the case where a position of the predetermined pixel in the detection target image as a basis of the calculation of the characteristic quantity is a predetermined position and for the case where the position of the predetermined pixel is a position moved from the original position by mirror reversal processing and/or rotation processing in 90 degree increments thereon, whereby the judgment is made as to whether the detection target image is a face image regarding predetermined combinations of face directions and orientations the number of which is larger than K.

* * * * *